(12) United States Patent
Plank

(10) Patent No.: US 9,744,634 B2
(45) Date of Patent: Aug. 29, 2017

(54) SUPPORT FOR WORKPIECES

(71) Applicant: Dick Plank, Cleveland, TX (US)

(72) Inventor: Dick Plank, Cleveland, TX (US)

( * ) Notice: Subject to any disclaimer, the term of this patent is extended or adjusted under 35 U.S.C. 154(b) by 316 days.

(21) Appl. No.: 14/321,139

(22) Filed: Jul. 1, 2014

(65) Prior Publication Data

US 2015/0000109 A1    Jan. 1, 2015

Related U.S. Application Data

(60) Provisional application No. 61/841,574, filed on Jul. 1, 2013, provisional application No. 62/000,993, filed on May 20, 2014.

(51) Int. Cl.

| | |
|---|---|
| *B23Q 3/10* | (2006.01) |
| *B23Q 3/06* | (2006.01) |
| *B23Q 1/03* | (2006.01) |
| *B25B 1/20* | (2006.01) |
| *B25B 5/14* | (2006.01) |
| *B25B 1/24* | (2006.01) |
| *B25B 1/10* | (2006.01) |

(52) U.S. Cl.
CPC ............ *B23Q 3/104* (2013.01); *B23Q 1/037* (2013.01); *B23Q 3/062* (2013.01); *B23Q 3/103* (2013.01); *B25B 1/103* (2013.01); *B25B 1/205* (2013.01); *B25B 1/2473* (2013.01); *B25B 5/147* (2013.01); *Y10T 29/49995* (2015.01)

(58) Field of Classification Search
CPC ........ B23Q 3/066; B23Q 3/102; B23Q 3/103; B23Q 3/104
See application file for complete search history.

(56) References Cited

U.S. PATENT DOCUMENTS

| 194,582 | A | * | 8/1877 | Cole | ..................... B65B 13/025 |
| | | | | | 254/104 |
| 1,274,554 | A | * | 8/1918 | Ives | ..................... E04G 17/0721 |
| | | | | | 254/104 |
| 2,771,822 | A | | 11/1956 | Blocksage | |
| 2,932,995 | A | | 4/1960 | Durfee | |
| 3,926,422 | A | * | 12/1975 | Wilson | ................... B23K 37/04 |
| | | | | | 269/218 |
| 4,340,211 | A | | 7/1982 | Chiappetti | |
| 4,413,818 | A | * | 11/1983 | Lenz | ..................... B25B 1/2484 |
| | | | | | 269/244 |
| 4,445,678 | A | * | 5/1984 | George | .................. B23Q 3/104 |
| | | | | | 269/282 |
| RE31,859 | E | * | 4/1985 | Aldridge, Jr. | ........... B23B 41/12 |
| | | | | | 269/73 |
| 4,535,689 | A | * | 8/1985 | Putkowski | ................ B30B 1/40 |
| | | | | | 100/214 |
| 5,494,268 | A | * | 2/1996 | Heintz | .................... B25B 13/52 |
| | | | | | 269/130 |
| 5,516,089 | A | | 5/1996 | Seniff et al. | |
| 5,727,778 | A | * | 3/1998 | Nodar | ..................... B25B 1/205 |
| | | | | | 269/296 |
| 5,980,191 | A | | 11/1999 | Trible | |

(Continued)

*Primary Examiner* — Monica Carter
*Assistant Examiner* — Seahee Yoon
(74) *Attorney, Agent, or Firm* — The Compton Law Firm, P.C.; Scott D. Compton

(57) ABSTRACT

The application is related to adjustable supports for holding objects in one or more desired fixed orientations, including but not necessarily limited to objects that lack uniformity as to size and/or shape and/or weight.

20 Claims, 24 Drawing Sheets

(56) References Cited

U.S. PATENT DOCUMENTS

| | | | | |
|---|---|---|---|---|
| 6,105,948 | A * | 8/2000 | Young | B25B 1/103 |
| | | | | 269/244 |
| 6,116,565 | A * | 9/2000 | Reinke | F16M 7/00 |
| | | | | 248/562 |
| 6,644,089 | B1 * | 11/2003 | Gorgen | B25B 5/06 |
| | | | | 29/243.58 |
| 6,681,464 | B1 | 1/2004 | Dupuis et al. | |
| 7,146,705 | B2 | 12/2006 | Ahti et al. | |
| 7,314,215 | B2 | 1/2008 | Vosoughkia | |
| 7,568,683 | B1 * | 8/2009 | Lovas | B25B 1/2463 |
| | | | | 269/43 |
| 7,820,942 | B1 | 10/2010 | Lamsfuss | |
| 8,714,536 | B2 | 5/2014 | Stadtfeld | |
| 9,296,089 | B2 * | 3/2016 | Schweigert | B25B 1/103 |
| 2008/0203637 | A1 * | 8/2008 | Li | B25B 1/103 |
| | | | | 269/71 |
| 2010/0264269 | A1 * | 10/2010 | Stoob | F16M 7/00 |
| | | | | 244/118.5 |
| 2013/0048927 | A1 * | 2/2013 | Epshetsky | B23Q 1/60 |
| | | | | 254/98 |

* cited by examiner

SUPPORT FOR WORKPIECES

CROSS-REFERENCE TO RELATED APPLICATIONS

This application claims priority on earlier filed U.S. Provisional Application No. 61/841,574, filed on Jul. 1, 2013 and U.S. Provisional Application No. 62/000,993, filed on May 20, 2014.

STATEMENT REGARDING FEDERALLY SPONSORED RESEARCH OR DEVELOPMENT

Not applicable.

FIELD OF THE APPLICATION

This application relates generally to supporting objects such as workpieces.

BACKGROUND

Support devices such as V-Blocks and the like are used by mechanics, metalworkers, machinists, and the like for holding objects in fixed positions in order to operate with or on the object itself. When working with tubular type workpieces, or other symmetrical workpieces, it is often required to orient a workpiece according to its center line or longitudinal axis lengthwise. However, because some workpieces lack uniformity as to size, shape and weight persons are routinely challenged with properly aligning and stabilizing non-uniform workpieces as desired or as otherwise required for a particular operation. For example, when working with a non-uniform workpiece of differing sizes near the ends of the workpiece, such workpieces do not naturally align in true horizontal, rather the smaller end tips downward onto the support device. Too often, spacers, shims and the like must be used with support devices like V-Blocks in order to realize and/or maintain the center line or longitudinal axis of a workpiece. Moreover, this alignment process can be time consuming and/or ineffective especially when the workpiece is too heavy to be simply readjusted manually by one or more persons.

A support for holding and orienting objects including workpieces that overcomes these disadvantages is desired.

BRIEF SUMMARY

The present application is directed to an assembly for supporting an object including (1) a base member; (2) a pair of support platforms in communication with a travel surface of the base member; and (3) an actuation member in communication with the support platforms, the actuation member dictating travel of the support platforms along the travel surface.

The present application is also directed to a support assembly for maintaining an object apart from a work bed including (1) a first pair of support platforms operationally configured to support a first part of an object along a first travel surface member; (2) a second pair of support platforms operationally configured to support a second part of the object along a second travel surface member; (3) a first cylindrical shaft in communication with the first pair of support platforms and operationally configured to dictate travel of the first pair of support platforms along the first cylindrical shaft in a manner effective to translate the first part of the object along both X and Y axes; and (4) a second cylindrical shaft in communication with the second pair of support platforms and operationally configured to dictate travel of the second pair of support platforms along the second cylindrical shaft in a manner effective to translate the second part of the object along both X and Y axes.

The present application is also directed to a method for multi-axis machining of a workpiece, comprising (a) providing an assembly operationally configured to (1) engage a floor plate of a multi-axis machining device, (2) contact the workpiece at one or more points along the workpiece in a manner effective to maintain the workpiece in a fixed position apart from the floor plate and (3) adjust the position of the one or more contact points in relation to the floor plate; and (b) with a workpiece supported by the assembly in a fixed position, using the multi-axis machining device to operate on the workpiece.

DESCRIPTION

Figure 1:
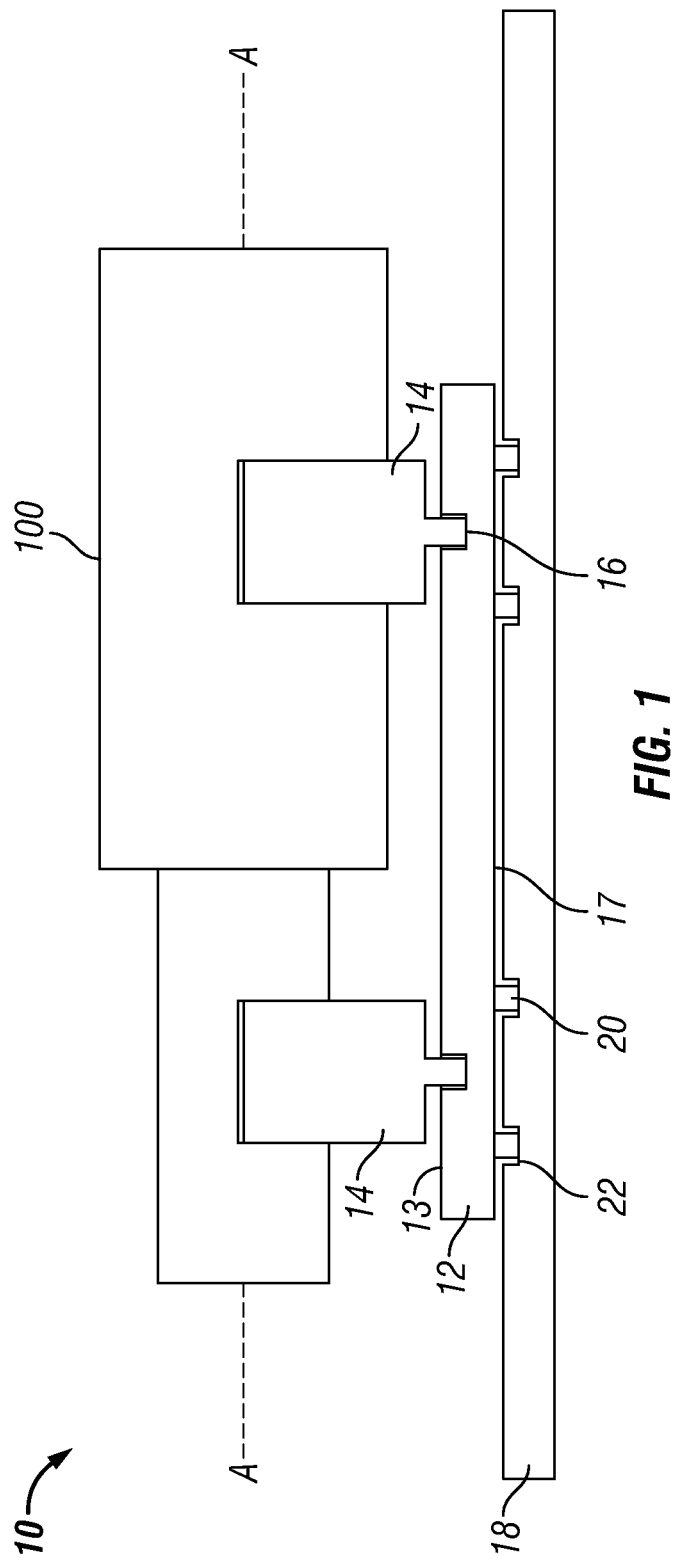
FIG. 1 is a side view of an embodiment of an assembly of this application.

It has been discovered that a support assembly may be provided for supporting and/or orienting an object such as a workpiece as desired, including maintaining the center line or longitudinal axis of an object that has opposing ends defined by varying outer widths, diameters and/or outer surface shapes and/or sizes and/or weights. Heretofore, such a desirable achievement has not been considered possible, and accordingly, the support assembly, system and method of this application measure up to the dignity of patentability and therefore represent a patentable concept.

Before describing the invention in detail, it is to be understood that the present support assembly, system and method are not limited to particular embodiments. It is also to be understood that the terminology used herein is for the purpose of describing particular embodiments only, and is not intended to be limiting. As used in this specification and the appended claims, the term "workpiece" may refer to any target object to be held and/or otherwise supported on the support assembly of the present application. One exemplary workpiece may include a three dimensional metal object intended for machine tooling and the like at one or more target work stations. Other workpieces are herein contemplated including, but not necessarily limited to mechanical devices such as engines, pumps and the like, wood working objects, plastic working objects, and combinations thereof. Herein, a "shim" may refer to a thin and often tapered or wedged piece of material, used to fill small gaps or spaces between objects. As understood by the skilled artisan, a "computer numerical control machine" (hereafter "CNC" machine) herein refers to a machine used in the manufacturing sector that involves the use of computers to control machine tools, including but not necessarily limited to lathes, mills, routers, grinders, and combinations thereof. The phrase "multi-axis machining" refers to a manufacturing process employing manual and/or computer numerically controlled tools that move in four or more ways to manufacture parts out of metals, plastics, rubbers, composite materials, woods, or other workpiece materials by milling away excess material from a workpiece by water jet cutting or by laser cutting. As also understood by the skilled artisan, a "V-Block" is a device typically used to hold round metal rods or pipes for performing drilling or milling operations. A typical V-Block consists of a rectangular steel or cast iron block with a 90.0 degree channel rotated 45.0 degrees from the sides, forming a V-shaped channel in the top of the block. As understood by persons of ordinary skill in the art of machining and the like, a "bed" or "work bed" as described herein may include a planar surface having one or more surface configurations. One bed contemplated herein includes a "T-Slotted Floor Plate" as understood by persons of ordinary skill in the art used in engineering industries as a rigid base for layout, marking, inspection, assembly work, large fixtures, special tooling and production set ups, for mounting jobs for precision welding and/or for carrying out machining operations like drilling, boring and the like and also as a test bed for mounting engines, large machines, transmission or other industrial equipment as desired. The present support assembly, system and method may also be used with one or more non-planar beds.

In one aspect, the application provides an adjustable support assembly, system and method for supporting an object such as a workpiece in one or more desired fixed orientations prior to working or operating on the object.

In another aspect, the application provides a support assembly, system and method for adjusting and/or setting the orientation of a workpiece longitudinally prior to working on the workpiece.

In another aspect, the application provides an adjustable support apparatus operationally configured to adjust the center line or longitudinal axis of a workpiece having different outer diameters near the distal ends of the workpiece, the apparatus providing both vertical and horizontal adjustment of the workpiece without the need of shims or other external devices.

In another aspect, the application provides an adjustable assembly, system and method for supporting a workpiece in a desired fixed orientation prior to working on the workpiece. In still another aspect, the application provides an assembly operationally configured to allow a workpiece to be precisely translated along both X and Y axes while being rigidly retained by the assembly. In still another aspect, the application provides an adjustable support assembly that may be used with one or more other support devices known in the art. For example, one part of an object such as a workpiece may be held in a fixed position using a known V-block and another part of the object may be supported by an adjustable support assembly of this application. In another example, one part of an object such as a workpiece may be suspended in a fixed position via lifting equipment and another part of the object may be supported by an adjustable support assembly of this application.

In another aspect, the application provides an assembly having opposing movable platform support members forming a "V" shape, also referred to herein as opposing "platforms" or "V-plates," each wing having a support surface defining a plane, wherein each of the platforms may be adjusted linearly along another plane in a manner effective to vertically adjust an object such as a workpiece supported by the platforms. Each of the platforms may be adjusted along still another plane in a manner effective to horizontally adjust the object.

In another aspect, the application provides a support assembly that may be adjusted in a manner effective to change, i.e., raise and/or lower and/or move horizontally, one or both ends of a workpiece as desired. In one embodiment, a workpiece may be raised or lowered at one or both ends to maintain or establish the workpiece in a desired alignment while supported by the support assembly.

In another aspect, the application provides an adjustable V-Block assembly wherein the centerline or longitudinal axis of a workpiece supported by the V-Block assembly may be manipulated in fine increments as desired along one or both X and Y axes in response to movement of one or more pairs of workpiece support surfaces or other assembly components.

In another aspect, the application provides a system for machining a workpiece supported by a support assembly including (1) a multi-axis machining device or the like and (2) an adjustable support assembly in communication with such device, the adjustable support assembly being operationally configured to adjust the center line or longitudinal axis of a workpiece supported by the adjustable support assembly. In one example, the adjustable support assembly may adjust the center line or longitudinal axis of a workpiece having differing outer diameters at its opposing distal ends, adjustment of the workpiece being accomplished both vertically and horizontally without the need of shims or like devices.

In another aspect, the application provides a system for machining a workpiece comprising a work station including but not necessarily limited to multi-axis machining devices. Suitable multi-axis machining devices including, but not necessarily being limited to milling and/or boring machines. The system suitably also includes an adjustable support assembly operationally configured to adjust the center line or longitudinal axis of a workpiece, including workpieces having varying outer diameters near opposing ends of the workpiece, adjustment of the workpiece is achievable vertically and/or horizontally without the need of shims or like devices.

In another aspect, the application provides an adjustable support assembly operationally configured to (1) rotate a workpiece held therein, the workpiece having different outer diameters near its opposing distal ends and (2) maintain, reset or otherwise realize the center line or longitudinal axis of a workpiece following rotation of the workpiece.

In another aspect, the application provides a portable support assembly that may be operationally configured to work with one or more commercially available CNC machines and/or commercially available milling or boring machines as desired. For example, the support assembly may be provided with a removable base member in order to provide a base member operationally configured to communicate with one or more particular CNC machines and/or commercially available milling or boring machines as desired.

In another aspect, the application provides an adjustable support assembly including a pair of opposing planar support surfaces, wherein the planar support surfaces may be adjusted linearly along a first plane in a manner effective to alter the width of the "V" formed by the planar support surfaces.

In another aspect, the application provides an adjustable support assembly including a pair of angled support surface members moveable along a track or similar device of the assembly. The track may be linear or non-linear or both.

In another aspect, the application provides an assembly including opposing workpiece support surfaces in communication with a base member, the support surfaces being operationally configured to pivot or to otherwise be repositioned to change the angles of the support surfaces relative to the base member.

In another aspect, the application provides an adjustable support assembly operationally configured to adjust the centerline or longitudinal axis of a workpiece supported by the support assembly, the support assembly including one or more restraints operationally configured to assist in securing a workpiece to the support assembly.

In another aspect, the application provides an adjustable support assembly operationally configured to be built to scale.

In another aspect, the application provides a support assembly for supporting a workpiece including a base member (or travel surface member) with a surface operationally configured to engage a T-slotted floor plate.

In another aspect, the application provides a support assembly including two or more base members and a pair of adjustable support members in communication with each base member for supporting a workpiece apart from the two or more base members.

In another aspect, the application provides a support assembly for supporting a workpiece, the support assembly including a base member, adjustable support members disposed along the surface of the base member and a shaft in communication with the supports, the shaft being operationally configured to adjust the distance between the support members along the surface of the base member. The support assembly may also include shaft supports near opposing ends of the shaft operationally configured to maintain the longitudinal axis of the shaft in a fixed position. In one implementation, the adjustable support members may include noncircular apertures for receiving the shaft there through.

In another aspect, the application provides a support assembly for supporting a workpiece, the support assembly including a base member, adjustable support members disposed along a first surface of the base member wherein the first surface of the base member includes one or more grooves for receiving at least part of the adjustable supports members therein, the configuration of the one or more grooves establishing the direction of travel of the adjustable support members along the first surface of the base member. The support assembly may also include one or more guide members operationally configured to maintain the adjustable supports in communication with the first surface of the base member. The support assembly may also include one or more locking members operationally configured to secure the adjustable support members to the base member in a fixed position. The support assembly may also include one or more restraints effective to maintain a workpiece in communication with the adjustable support members. The base member may also include a second surface operationally configured to engage a T-slotted floor plate in a manner effective to orient the base member in two or more directions relative to the T-slotted floor plate.

In another aspect, the application provides a support assembly for supporting a workpiece, the support assembly including a base member and adjustable support members in communication with the base member. In one implementation, the adjustable support members may include substantially planar platforms forming a V-shape for supporting a workpiece. In one implementation, the adjustable support members may be operationally configured to receive one or more spacer members in attachment thereto, the spacer members providing support surfaces for a workpiece apart from the planar platforms.

In another aspect, the application provides an assembly for supporting a workpiece, the assembly including a base member, a pair of support platforms in communication with a travel surface of the base member and an actuation member in communication with the support platforms, the actuation member dictating travel of the support platforms along the travel surface. In one embodiment, the actuation member may be in threaded communication with the support platforms. In one embodiment, the travel surface is defined by a length less than the length of the actuation member. In one embodiment, the actuation member may include a cylindrical shaft set apart from a planar travel surface of the base member. In one embodiment, the assembly may include one or more actuation member supports in communication with the base member near opposing ends of the actuation member and operationally configured to maintain the longitudinal axis of the actuation member substantially parallel to the plane of the travel surface of the base member. In one embodiment, the assembly may include one or more guide retaining members disposed along the base member and operationally configured to maintain the support platforms in communication with the travel surface during operation of the actuation member. In an embodiment including an actuation member in the form of a cylindrical shaft, the assembly may include a first shaft support member securable to the base member near one end of the shaft and a second shaft support member in communication with the first shaft support member and in communication with the travel surface of the base member.

To better understand the novelty of the support assembly, system and method of use thereof, reference is hereafter made to the accompanying drawings. One simplified embodiment of an assembly for supporting an object including a workpiece having varying outer diameters, widths and/or shapes near its opposing ends is provided in FIGS. 1-3. As shown, the assembly 10 may include a base member (hereafter "base 12") having a first surface 13 operationally configured to receive one or more pairs or sets of support platforms (hereafter "platforms 14") in either permanent or releasable communication in a manner effective to provide linear adjustment of each of the platforms 14 along the length of the first surface 13 of the base 12 in a manner effective to orient the mid-point, center line or longitudinal axis A-A of a workpiece 100 as desired. As illustrated in FIG. 2, by setting opposing platforms 14 at a first distance apart, the mid-point, center line or longitudinal axis A-A of the tubular workpiece 100 is suitably set at a first position. In operation, as the pair of platforms 14 are adjusted, either drawing the opposing platforms 14 closer together or further apart, the distance between the mid-point, center line or longitudinal axis A-A of the workpiece 100 and the base 12 adjusts accordingly changing the position of the workpiece 100 relative to the base 12. For example, as depicted in FIG. 3 as the platforms 14 are directed closer together (see directional arrows AA and AB), the workpiece 100 supported by the assembly 10 is directed away from the base 12 (according to directional arrow BB) whereby the outer surface of the workpiece 100 contacts the platforms 14 closer to the distal edges of the platforms 14 as compared to the position of the workpiece 100 as shown in FIG. 2.

Figure 2:
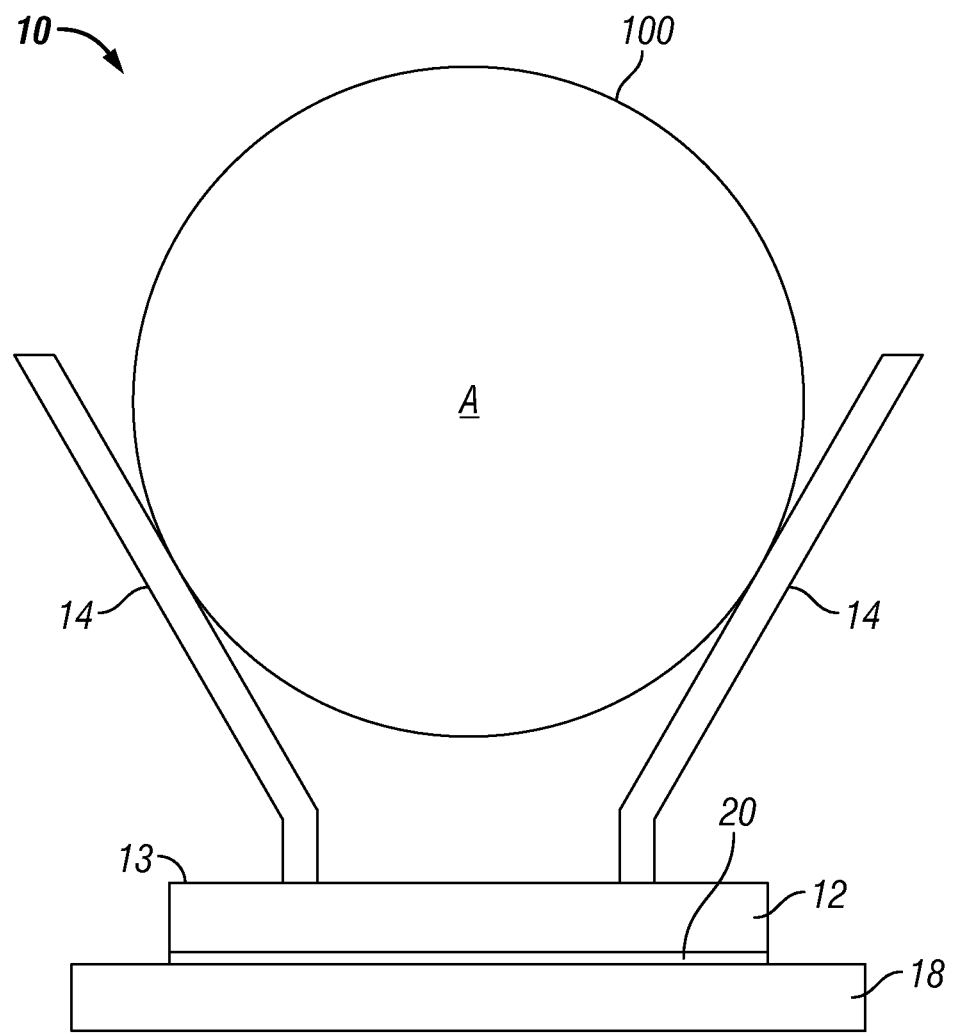
FIG. 2 is a front view of an embodiment of an assembly of this application.
Figure 3:
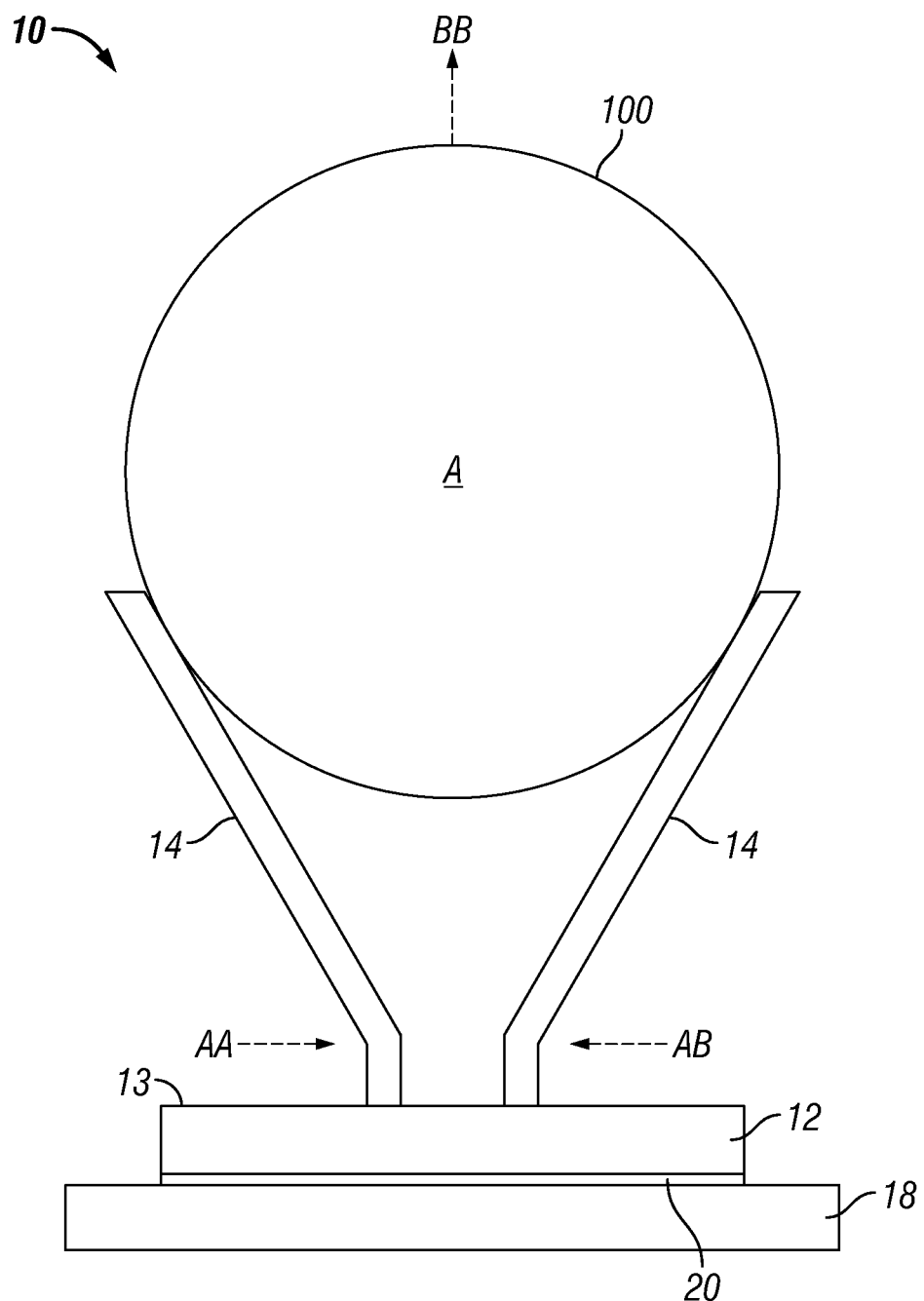
FIG. 3 is a front view of an embodiment of an assembly of this application.

With further attention to FIGS. 2 and 3, suitable platforms 14 may include substantially planar rectangular type support surfaces disposed from about 15.0 degrees to about 75.0 degrees relative to the base 12 as desired. In the embodiments of this application, opposing platforms 14 are shown at about 45.0 degrees relative to the first surface 13 of the base 12, the platforms 14 forming a "V" like configuration for supporting workpieces 100 thereon. In another embodiment, individual platforms 14 may be provided having differing angled support surface as desired, e.g., one platform 14 at about 45.0 degrees and the opposing platform 14 at about 60.0 degrees to accommodate a particular workpiece 100. In another embodiment, the assembly 10 may be operationally configured to include platforms 14 having support surfaces of varying shapes including multi-sided platform surfaces, platforms with curved borders, and combinations thereof. Also, platforms 14 may be provided in varying sizes, e.g., small, medium, large, extra-large, etc., each size being operationally configured to communicate with the first surface 13 of the base 12. As an example, a particular assembly 10 may be provided to support workpieces 100 having widths or outer diameters from about 7.62 cm to about 76.2 cm (about 3.0 inches to about 30.0 inches). In still another embodiment, one or more platforms 14 may include a non-planar support surface to accommodate a particular workpiece 100. It is also contemplated that one or more platforms 14 may be configured to releasably receive one or more side panels and the like that are operationally configured to be secured to a platform 14 in a manner effective to increase the surface area of the support surface of a platform 14. For example, one or more platforms 14 and corresponding side panels may include male/female mating surfaces as desired.

Figure 4:
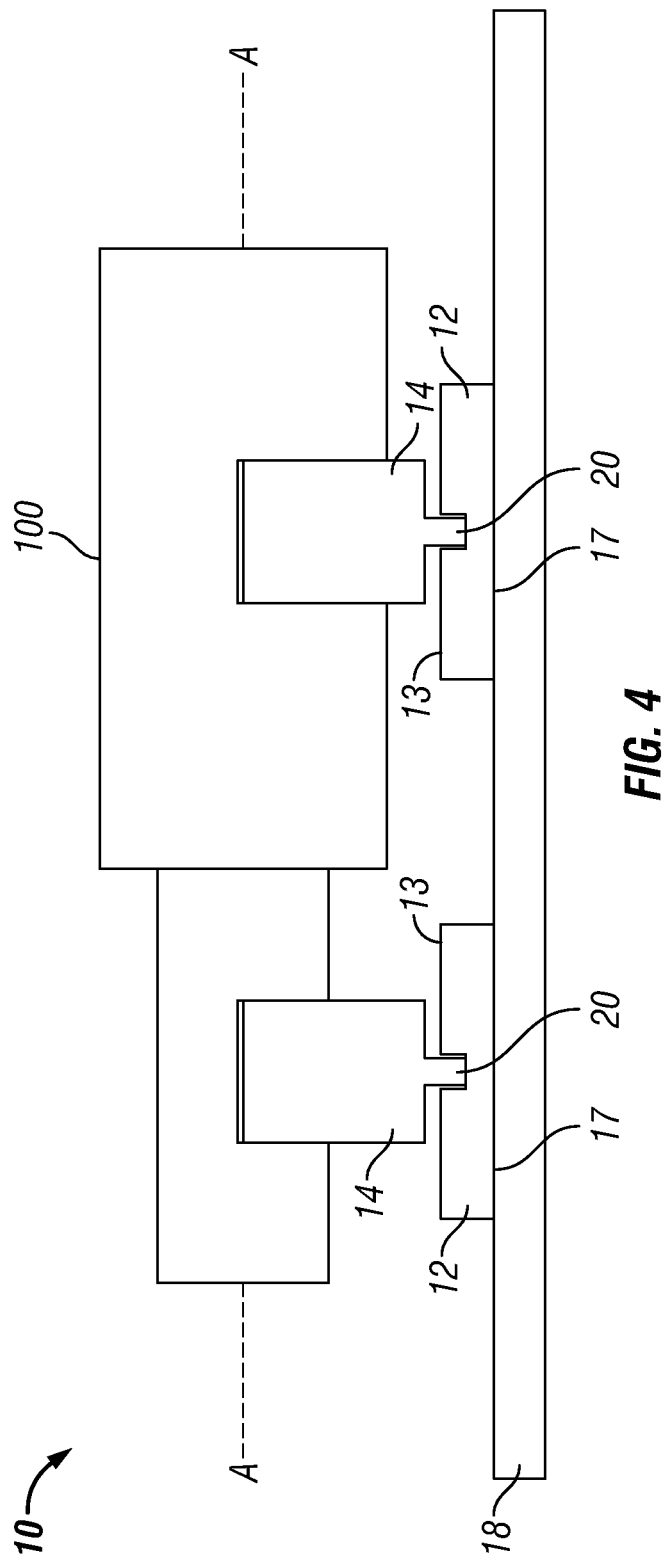
FIG. 4 is a side view of an embodiment of an assembly of this application.

Referring again to FIG. 1, the base 12 may be provided as a single member with one or more guides 16 disposed along the first surface of the base 12 (the "travel surface" of the base 12), the guides 16 being in communication with at least part of the one or more pairs of platforms 14 as shown, the guides 16 providing a directional path for the platforms 14 along the first surface 13 of the base 12. In another simplified embodiment as shown in FIG. 4, the assembly 10 may be provided with multiple bases 12, each base 12 being in communication with at least one pair of platforms 14. Without limiting the invention to a particular embodiment, suitable guides 16 may include, but are not necessarily limited to grooves, raised tracks, and combinations thereof operationally configured to receive at least part of the platforms 14 in travel communication therewith whereby the platforms 14 can be directed apart and toward one another along the guides 16. In one suitable embodiment, guides 16 may be provided as grooves of a particular depth and width. In one suitable embodiment, platforms 14 may be moved apart up to about the edges of the base 12 and inward to about a center line of the base 12.

In operation, the platforms 14 may be secured to the base 12 in a locked or fixed position as desired. For example, the platforms 14 may be operationally configured to be bolted or otherwise secured to the base 12 as desired. In another embodiment, the platforms 14 may be clamped to the base 12. In still another embodiment, the platforms 14 may be fixed in a static state via spacers placed on one or both sides of the base of the platforms 14 to prevent travel of the platforms 14 along the guides 16. In still another embodiment, the base 12 may be provided with a series of holes whereby the position of the platforms 14 may be adjusted by securing the platforms 14 to the base 12 via corresponding holes of the base 12 using bolts, releasable dowel pins, and the like to secure the platforms 14 to the base 12. In another embodiment, the base of the platforms 14 may include spring loaded pins operationally configured to mate with holes disposed along the base 12 for securing one or more platforms 14 in a fixed position. In an embodiment where the assembly 10 includes metal parts (and depending on the intended purpose of a particular assembly 10), one or more magnets may be employed to assist in fixing the platforms 14 to the base 12 in a static state.

In another embodiment, it is contemplated that the platforms 14, rather than the base 12, be provided with guides for receiving a raised track type member disposed along the base 12 effective to provide movement of the platforms 14 along the base 12. For example, the platforms 14 may include grooves or recessed sections operationally configured to rest upon a raised track disposed along the base 12. In another embodiment, the platforms 14 of the assembly 10 may be supported upon or otherwise include slide plates (not shown), which are in directional communication with guides 16 as described above.

In multi-axis machining type operations, the ability to adjust the distance between a pairs of platforms 14 along the guides 16 allows the assembly 10 to orient sections of a workpiece 100 vertically as shown in FIGS. 1-3. It is also contemplated that the present assembly 10 may be operationally configured to direct a workpiece 100 horizontally by either (1) manually moving the workpiece 100 in relation to the assembly 10, (2) by configuring the one or more pairs of platforms 14 and/or slide plates to move along the first surface 13 of the base 12, or (3) by configuring the one or more bases 12 to move along a support surface of the assembly 10 (see support surface 18 in FIGS. 1-3). In another example, if one end of a workpiece 100 is significantly heavier than the opposing end, moving or adjusting only the pair of platforms 14 supporting the heavier end of the workpiece 100 may result in the lighter opposing end of the workpiece 100 simply sliding or dragging across the platforms 14 supporting the lighter end of the workpiece 100. Thus, the present assembly 10 may include two or more pairs of platforms 14 that are simultaneously adjustable in order to prevent sliding of a workpiece 100 off from a particular pair of platforms 14.

With particular reference to FIGS. 1 and 4, the assembly 10 may be placed on a support surface operationally configured to support a base 12 of the assembly 10. A suitable support surface may include any support surface as desired for a particular assembly 10. As such, the second surface 17 of the base 12 may include a surface configuration operationally configured to engage one or more particular support surface (hereafter "bed 18") configurations. Without limiting the bed 18 of this application to any particular configuration, suitable beds 18 for engaging a base 12 may include substantially planar surfaces including, but not necessarily limited to bare ground, a floor surface, a table top, a bench top, a T-slotted floor plate of a work station, saw horses and the like, and combinations thereof. As shown in FIG. 1, the second surface 17 of the base 12 may include raised tracks 20 or the like operationally configured to mate with grooves, recesses and the like 22 of a corresponding bed 18 allowing the base 12 to be directed along the length of the grooves 22 as desired. As shown in the simplified embodiment of FIG. 4, the second surfaces 17 of the bases 12 may simply abut a bed 18 in a slideable fashion as desired. In another embodiment, it is contemplated that a bed 18 may be provided as part of the assembly 10.

Figure 5:
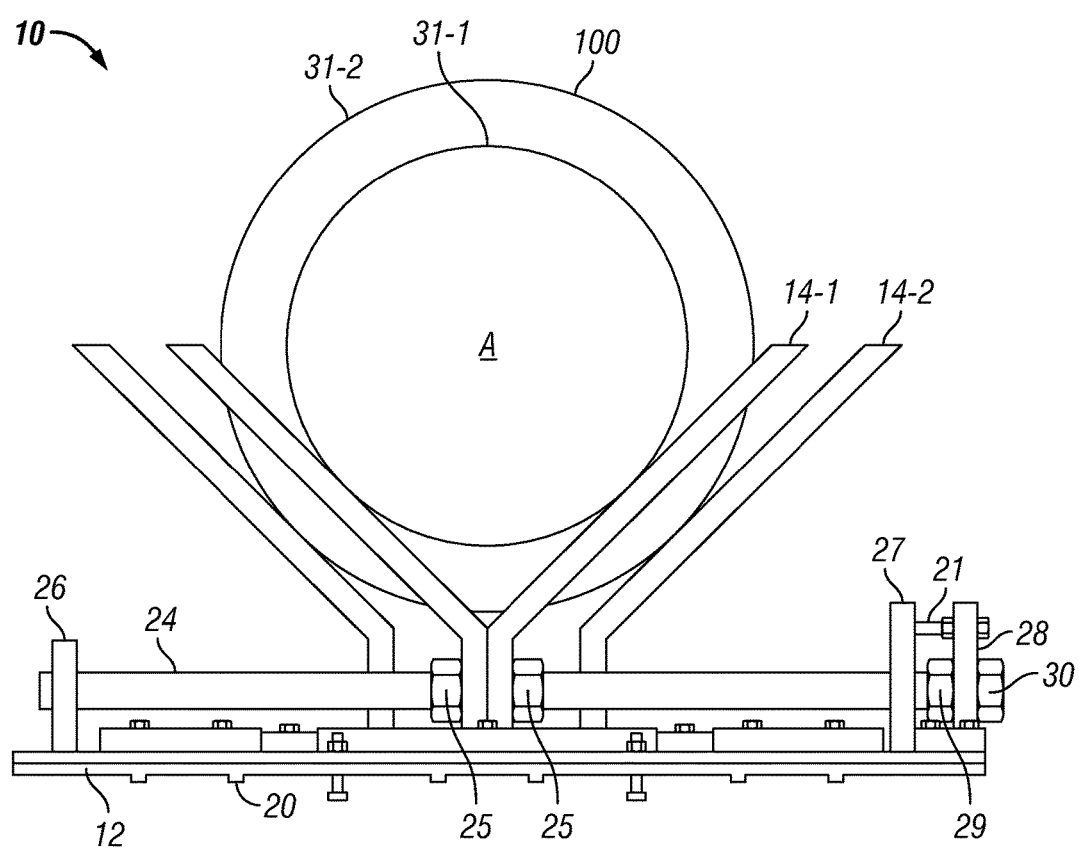
FIG. 5 is a front view of an embodiment of an assembly of this application.

With attention now to FIG. 5, another simplified embodiment of an assembly 10 for supporting a workpiece 100 including two substantially collinear sections with different outer diameters (see 31-1 and 31-2) is provided. As shown, a first pair of platforms 14-1 are operationally configured to support the smaller section 31-1 of the workpiece 100 and a second pair of platforms 14-2 are operationally configured to support a larger section 31-2 of the workpiece 100. As FIG. 5 illustrates, according to the outer diameter of the smaller section 31-1, the first pair of platforms 14-1 are set closer in proximity than the second pair of platforms 14-2 in a manner effective to maintain the longitudinal axis A-A of the workpiece 100 in a substantially horizontal position.

As further shown in the embodiment of FIG. 5, the assembly 10 may include a platform actuation member 24 operationally configured to dictate travel of the platforms 14 across the first surface 13 of the base 12. In other words, a platform actuation member 24 may be operationally configured to adjust the distance between a pair of platforms 14 along the first surface 13 of the base 12. In one particular embodiment, the actuation member 24 may be provided as a threaded cylindrical adjustment shaft ("shaft 24") threadedly connected to the platforms 14, one end of the shaft 24 having a right hand thread, the opposing end of the shaft having a left hand thread, whereby directional travel of the platforms 14 along the base 12 is determined according to rotation of the shaft 24, e.g., clockwise, counterclockwise. When the shaft 24 is in a resting position, the corresponding platforms 14 remain in a fixed position.

As further shown in FIG. 5, a first end of the shaft 24 may be supported apart from the base 12 via a first shaft support member 26 located near a first end of the base 12, the first shaft support member 26 being releasably attached to the base 12 via fasteners including, but not necessarily limited to pins, threaded connectors, and combinations thereof. As shown, the first shaft support member 26 may be provided as a multi-sided member with an aperture 33 for receiving the threaded adjustment shaft 24 there through (see FIG. 11). In one embodiment, the aperture 33 has an inner diameter operationally configured to abut the outer surface of the shaft 24 disposed there through. In another embodiment, the aperture 33 may have an inner diameter slightly larger than the outer diameter of the adjustment shaft 24 effective to allow for movement or play of the adjustment shaft 24 during assembly 10 operation as such is understood by the skilled artisan.

The second end of the shaft 24 may be supported via a second shaft support member 27 and an actuation support member 28 located near a second end of the base 12. Although the second shaft support member 27 as illustrated in FIG. 5 has a configuration similar as the first shaft support 26, including a similar aperture 41, such is not necessarily required. As shown, the actuation support member 28 suitably lies in communication with the shaft 24 via aperture 35 (see FIG. 23) and is sandwiched between threaded members including, but not necessarily limited to nuts 29, 30 or like items that are in communication with the shaft 24 and operationally configured to be manipulated in a manner effective to rotate the shaft 24 clockwise and/or counterclockwise as desired. For example, the outermost nut 30 may be operationally configured to receive a tool such as a socket, a wrench or other lever type device operationally configured to turn the nut 30 and shaft 24 attached thereto. As discussed below, the assembly 10 may also include an adjustment member 21 operationally configured to direct the actuation support member 28 linearly toward and away from the second shaft support member 27 in a manner effective to move assembly 10 components along the first surface 13 of the base 12. In other words, the adjustment member 21 is operationally configured to direct the actuation support member 28 linearly toward and away from the second shaft support member 27 in a manner effective to move the shaft 24 and the platforms 14, when set in a fixed position, along the first surface 13 of the base 12.

Still referring to the embodiment of FIG. 5, each of the platforms 14 may also include a threaded member 25 including, but not necessarily limited to a threaded nut 25 attached to each platform 14 adjacent an aperture 23 through each platform 14 (see FIG. 18), the threaded nuts 25 being in communication with the shaft 24 and operationally configured to act on each of the platforms 14 to direct the platforms 14 toward one another or apart depending on the direction the shaft 24 is rotated at any given moment according to the Right Hand/Left Hand thread configuration of the shaft 24. Suitably, the threaded members 25 may be attached to the platforms 14 as desired. In an embodiment including metal platforms 14 and metal nuts 25, the nuts 25 may be welded to the platforms 14. In another embodiment, one or more of the threaded members 25 may be adhered to the platforms 14 with one or more substances as known by those of ordinary skill in the art.

Figure 18:
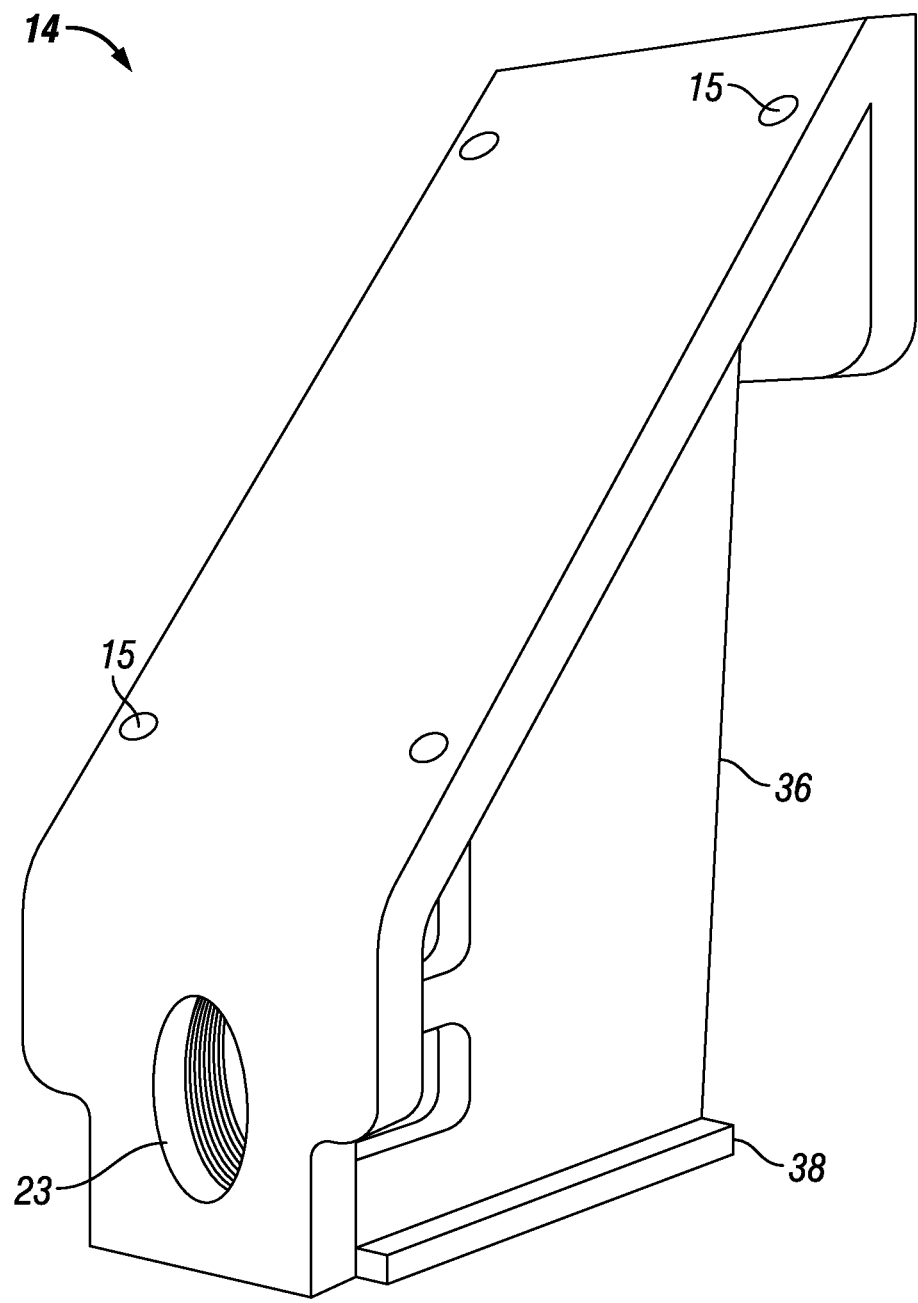
FIG. 18 is a view of an exemplary support platform of this application.

In another embodiment, it is contemplated that the aperture 23 through each of the platforms 14 include a threaded surface for receiving the shaft 24 there through whereby the shaft 24 acts on each of the threaded surfaces of the apertures 23 causing the platforms 14 to move toward one another or apart depending on the direction the threaded adjustment shaft 24 is rotated at any given moment according to the Right Hand/Left Hand thread configuration of the shaft 24. In one embodiment, the inner surfaces of the apertures 23 of the platforms 14 may be circular having an inner diameter effective to contact or otherwise communicate with the outer surface of a cylindrical shaft 24 up to 360.0 degrees. In another embodiment as shown in FIG. 18, the apertures 23 of the platforms 14 may include non-circular curved inner surfaces such as elliptical or oblong shapes allowing for movement, flexibility or play of a shaft 24 during assembly 10 operation as such is understood by the skilled artisan.

As previously mentioned, the platforms 14 may be supported upon slide plates or the like which are in communication with guides 16 of the base 12. Thus, it is further contemplated that the platforms 14, and shaft 24 fixed thereto, may be moved horizontally as a unit along the guides 16 in a manner effective to reposition the shaft 24 relative to the stationary base 12 for adjusting the position of the workpiece 100 supported by the platforms 14. In another embodiment, the assembly 10 may include one or more reinforcement members, including but not necessarily limited to block or plate assemblies (not shown) operationally configured to secure the platforms 14 and the shaft 24 disposed there through in a secure position relative to the guides 16 prior to adjusting the platforms 14 and the shaft 24 in a horizontal direction along the base 12.

Horizontal movement of various assembly 10 components may be accomplished by securing a second end of the shaft 24 to the actuation support member 28 via aperture 35, the actuation support member 28 being in travel communication with the guides 16. As shown in FIG. 5, the second shaft support member 27 may be secured to the base 12 at a point between the platforms 14 and the actuation support member 28. In operation, the second shaft support member 27 and actuation support member 28 are suitably connected via an adjustment member 21 disposed through axially aligned apertures 43, 44 of the second shaft support member 27 and actuation support member 28. A suitable adjustment member 21 may include a threaded connector such as a bolt or screw type fastener whereby the actuation support member 28 may be adjusted horizontally along the base 12 toward and away from the second shaft support member 27 according to the direction the adjustment member 21 is rotated. In addition, the actuation support member 28 may include a fastener such as a clamp, nut and bolt assembly or other device operationally configured to secure the actuation support member 28 to the base 12 to help prevent against horizontal movement of the assembly 10 components during operation of the assembly 10.

In one embodiment, the aperture 41 of the second shaft support member 27 (see FIG. 24) and the aperture 35 of the actuation support member 28 may each have an inner diameter operationally configured to abut the outer surface of the shaft 24. In another embodiment, the apertures 35, 41 may have inner diameters slightly larger than the outer diameter of the shaft 24 effective to allow for some movement or play of the shaft 24 during assembly 10 operation as such is understood by the skilled artisan.

Figure 6:
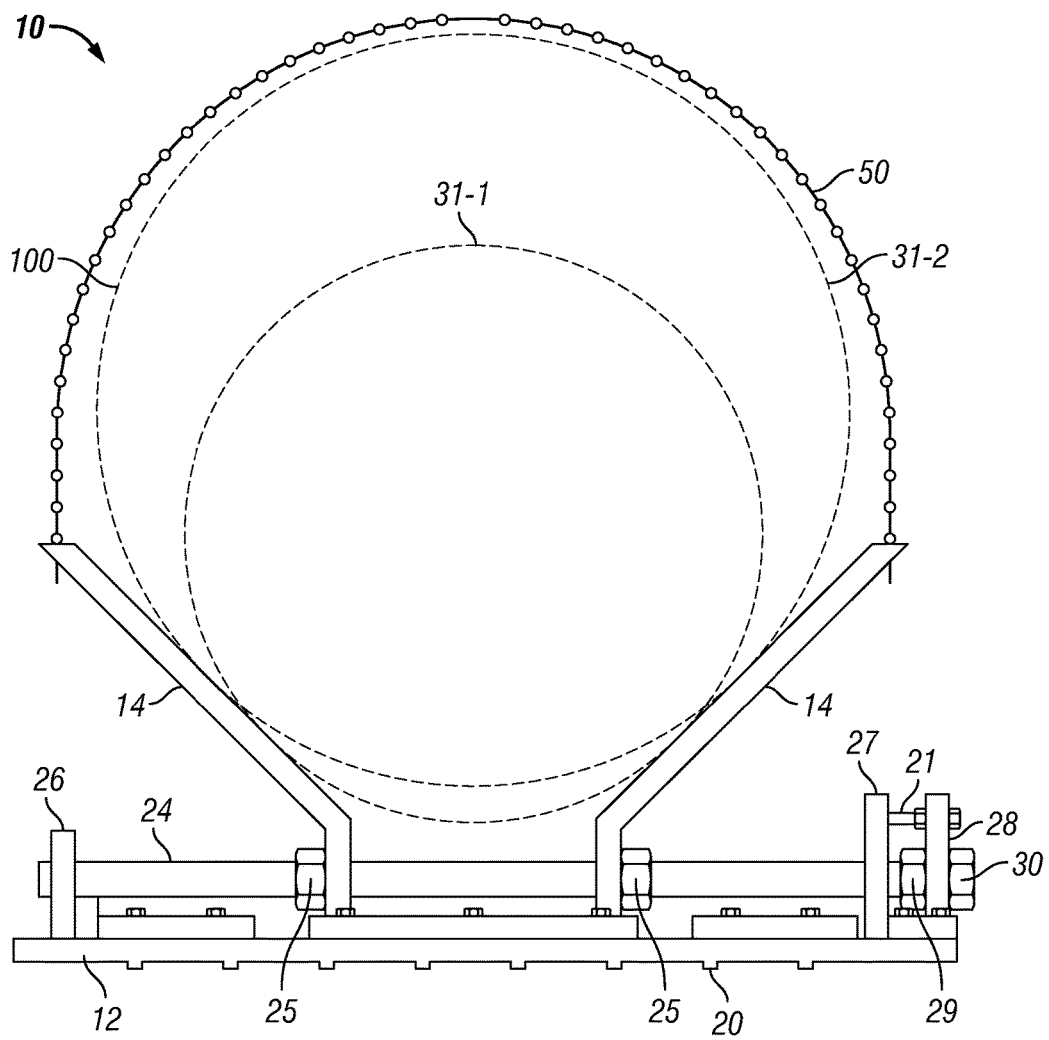
FIG. 6 is a front view of an embodiment of an assembly of this application.

FIG. 6 provides another simplified embodiment of an assembly 10 including for supporting a workpiece 100, the workpiece 100 having two nonlinear sections 31-1 and 31-2. When working with nonsymmetrical workpieces 100, or other workpieces defined by irregular outer surface configurations, the present assembly 10 is operationally configured to adjust the pairs of platforms 14 to orient and hold the workpiece 100 vertically and/or horizontally as desired. The assembly 10 of this application may also include one or more restraints 50 disposed along the outer surface of a workpiece 100 and operationally configured to assist in securing a workpiece 100 to the platforms 14 as desired. In one embodiment, one or more restraints 50 may be releasably connected to each of a pair of platforms 14. In another embodiment, one or more restraints 50 may be releasably connected to the base 12 or a base 12 at one end and a platform 14 at the opposing end of the restraint 50. Suitable restraints 50 may include, but are not necessarily limited to chains and other link material, belts, ropes, straps, tapes, wires, bungee cords, and combinations thereof for securing the workpiece 100 to the assembly 10.

Figure 7:
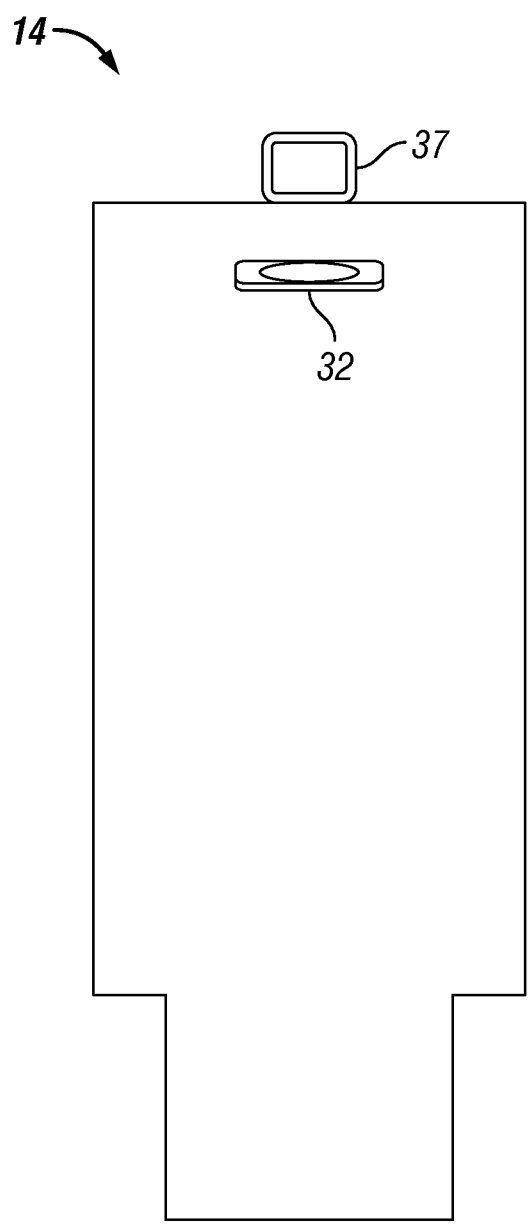
FIG. 7 is a back view of part of an exemplary support platform of this application.

In one simplified embodiment as shown in FIG. 7, a platform 14 may be provided with a holder 32 operationally configured to receive a restraint 50 in secure attachment thereto. For example, in an embodiment where the restraint 50 includes a chain, the chain may be latched to the holder 32 as desired. In an embodiment where the restraint 50 includes a strap, the strap may be looped through the holder 32 in a manner effective to secure the strap to the holder 32. In addition, platforms 14 may be provided with one or more lifting members 37 or the like for transporting or otherwise repositioning the assembly 10, e.g., repositioning the assembly 10 within a CNC machine or other work station. In another embodiment, one or more lifting members 37 may be located along other surfaces of an assembly 10, e.g., along the base 12. In the embodiment of the platform 14 shown in FIG. 7, one or more lifting members 37 may be located near the distal ends of the platforms 14 providing easy access to the lifting members 37. In still another embodiment, the platforms 14 may include apertures there through instead of or in addition to holders 32, the apertures being operationally configured to receive a restraint 50 in secure attachment thereto or used in conjunction with the lifting members 37 as desired. The platforms 14 may also include one or more handles and/or raised surfaces and/or cavity type surfaces for ease of transport and/or repositioning of the assembly 10.

Figure 8:
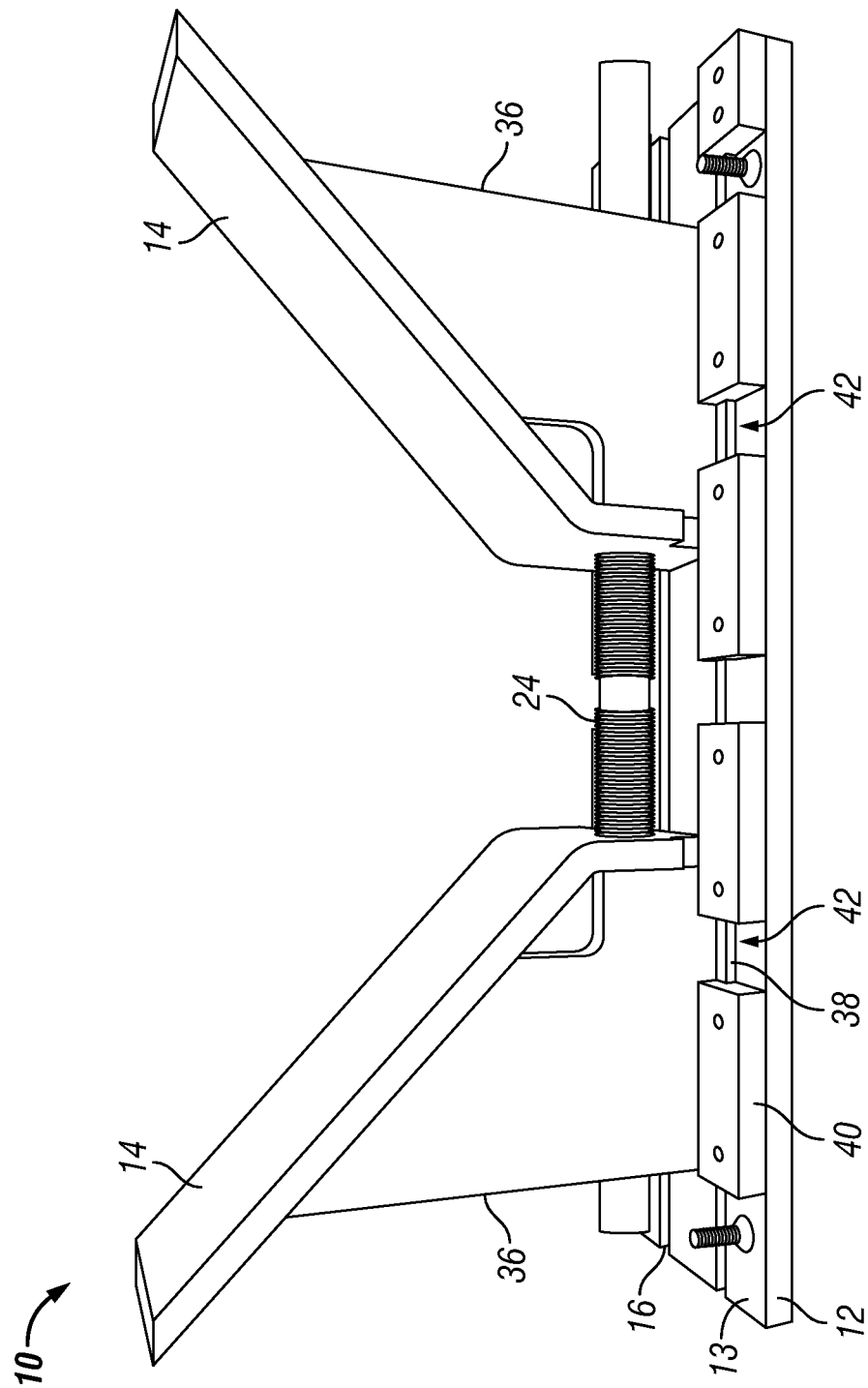
FIG. 8 is a perspective front view of an embodiment of an assembly of this application.

Turning to FIG. 8, another simplified embodiment of an assembly 10 is provided including opposing platforms 14 with planar support surfaces forming a "V" type shape there between. As shown, the assembly 10 suitably includes at least (1) a base 12, (2) a pair of opposing platforms 14 operationally configured to support a workpiece 100 and (3) a threaded adjustment shaft 24 operationally configured to regulate the distance between the platforms 14 from a contact position of the platforms 14 near the center of the assembly 10 to a maximum distance apart, including a travel distance of each platform 14 up to about the opposing distal edges of the base 12. In this embodiment, a first shaft support member 26, a second shaft support member 27, an actuation support member 28 and an adjustment member 21 may be added to the assembly 10 as desired.

Figure 9:
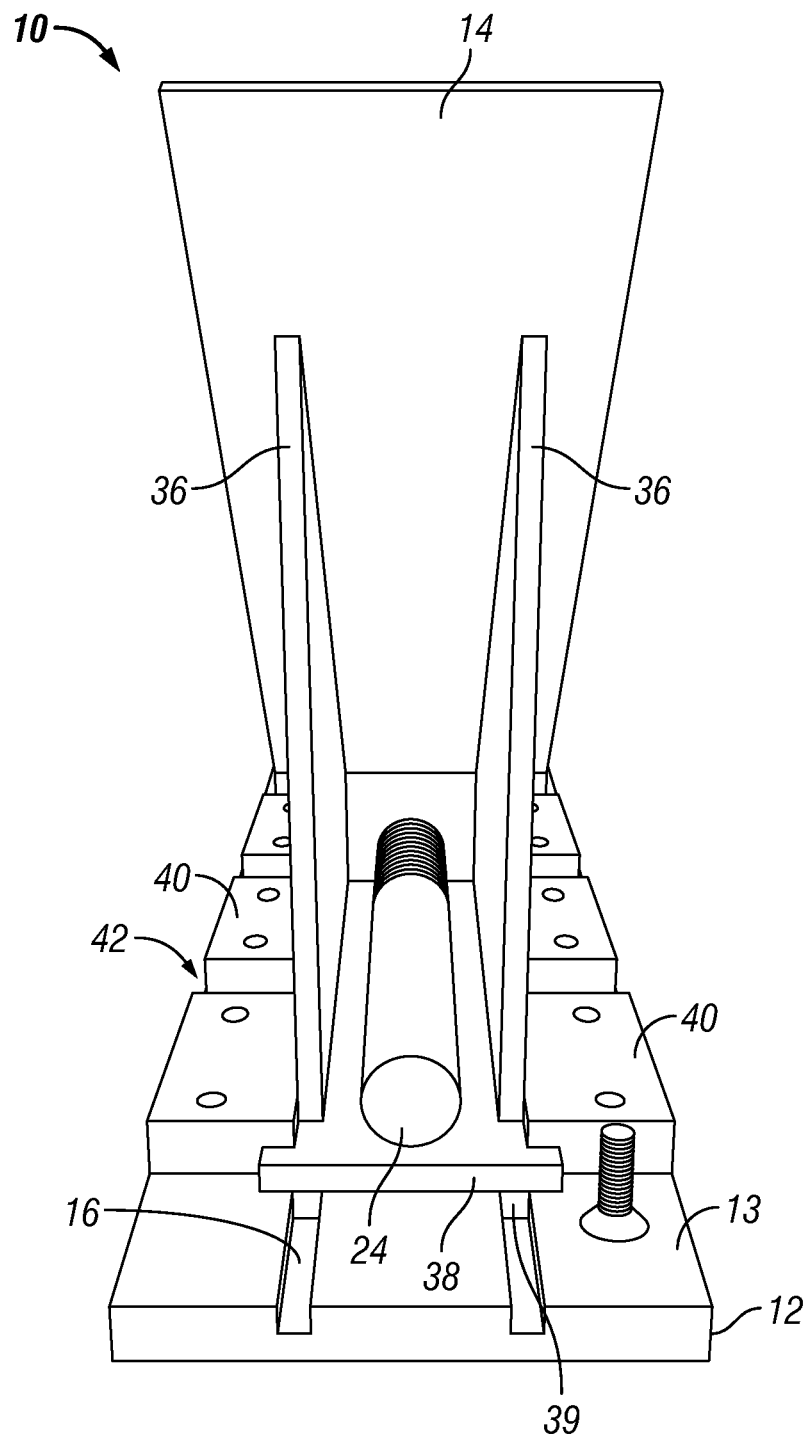
FIG. 9 is a perspective side view of an embodiment of an assembly of this application.

As FIG. 8 also shows, each of the platforms 14 may further include bracing members 36 that are operationally configured to reinforce the platforms 14 during operation. In one embodiment, the bracing members 36 may directly engage corresponding guides 16 along the base 12. As shown in FIG. 9, the bracing members 36 may be attached to slide plates 38 having raised tracks 39 operationally configured to engage corresponding guides 16. As FIG. 9 further illustrates, the bracing members 36 may include substantially parallel planar plate type members disposed along either side of the shaft 24. Depending on the intended use of the assembly 10 and/or the size of the platforms 14, the size and/or number and/or shape of the bracing members 36 may vary as desired. For example, in one embodiment bracing members 36 may include one or more vertical type beam members.

As FIGS. 8 and 9 illustrate, the assembly 10 may also include one or more guide retaining members having raised surfaces (shown as guide retaining blocks 40 or "guide blocks 40") operationally configured to prevent lateral movement of the platforms 14, i.e., to assist in maintaining proper alignment of the platforms 14 relative to the guides 16 and/or assist in preventing the slide plates 38 from disengaging the corresponding guides 16. The assembly 10 may also include one or more locking members (discussed below) operationally configured to prevent horizontal movement of the platforms 14 apart from the base 12 during assembly 10 operation. For example, locking members may be provided in the spaces or gaps along the base 12 between guide blocks 40 (at gaps 42 in FIG. 8), wherein the locking members are operationally configured to be releasably attached to the base 12 in a manner effective to secure, lock or otherwise sandwich at least part of the slide plates 38 between the locking member and base 12.

Figure 10A:
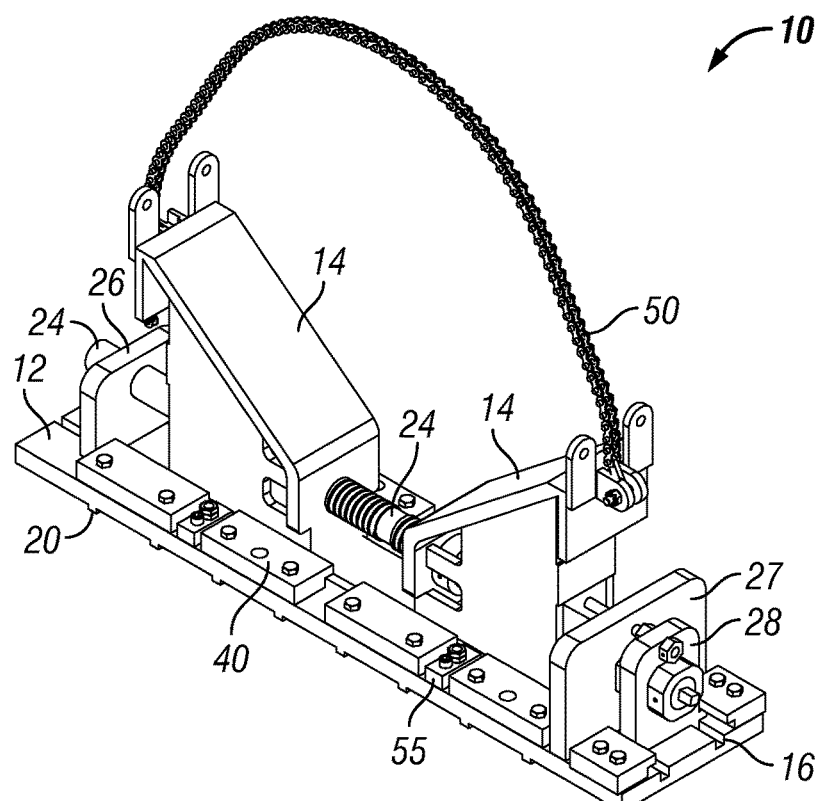
FIG. 10A is a perspective view of an embodiment of an assembly of this application.
Figure 10B:
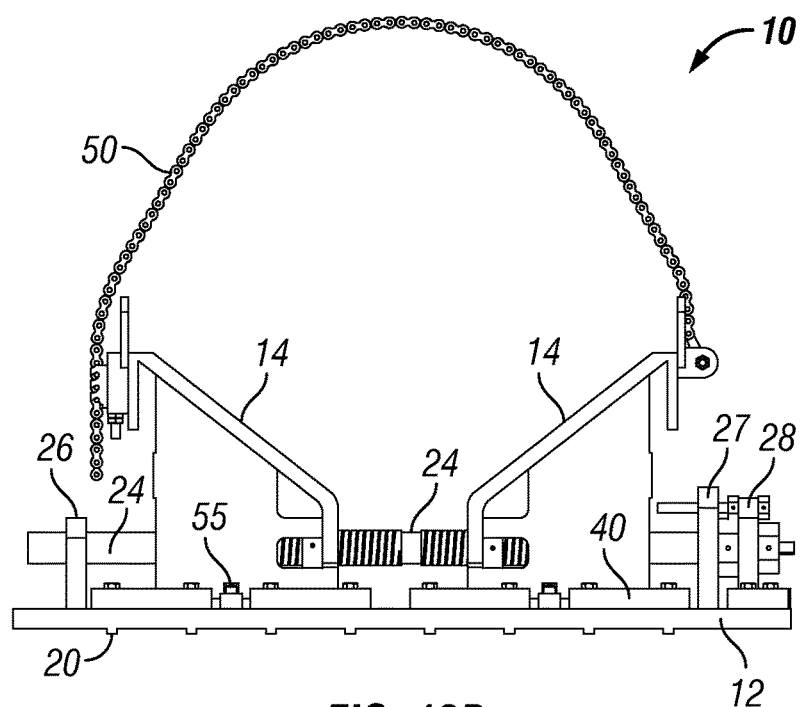
FIG. 10B is a front view of the embodiment of FIG. 10A.
Figure 11:
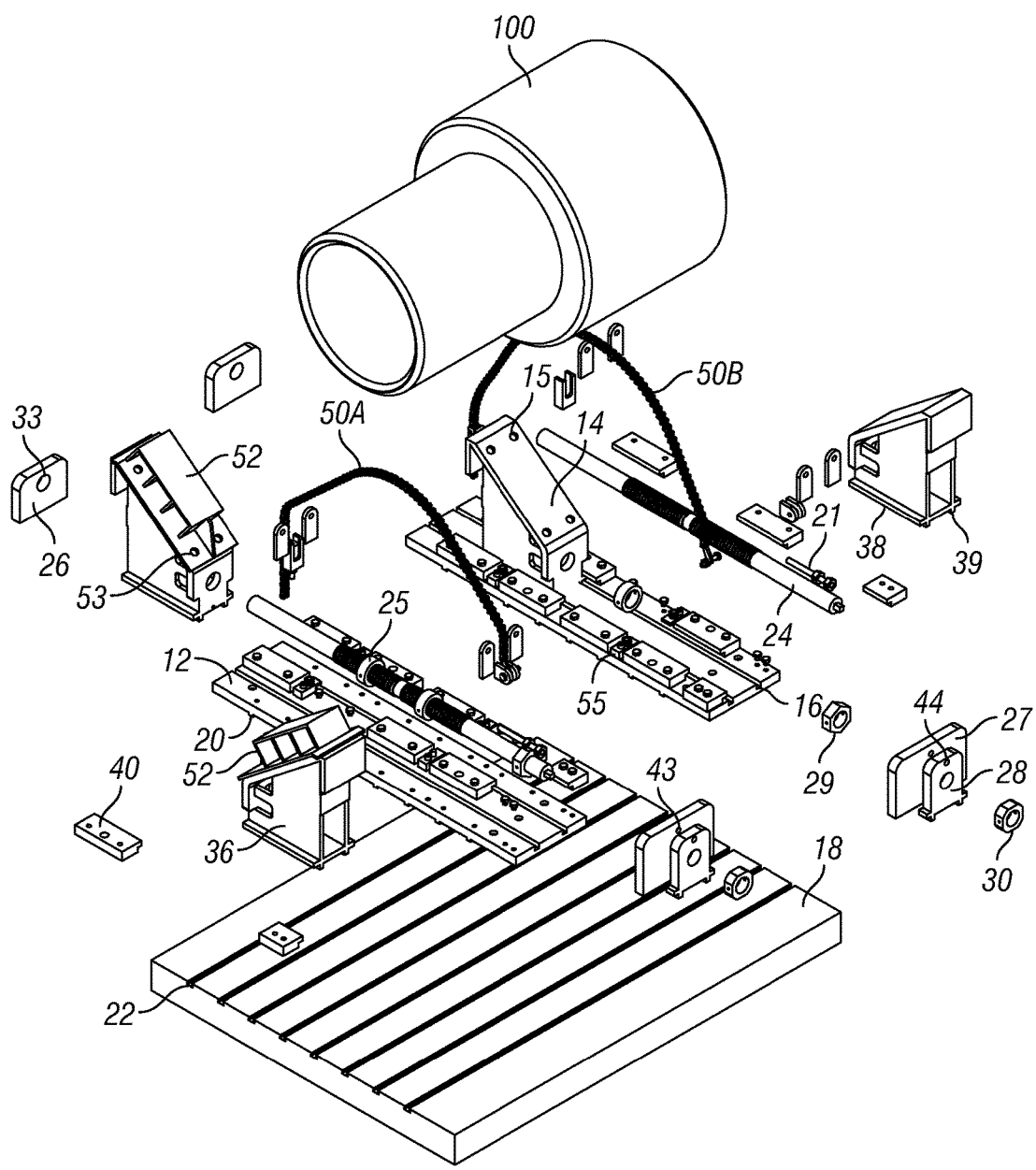
FIG. 11 is an exploded view of an embodiment of an assembly and exemplary workpiece of this application.
Figure 12:
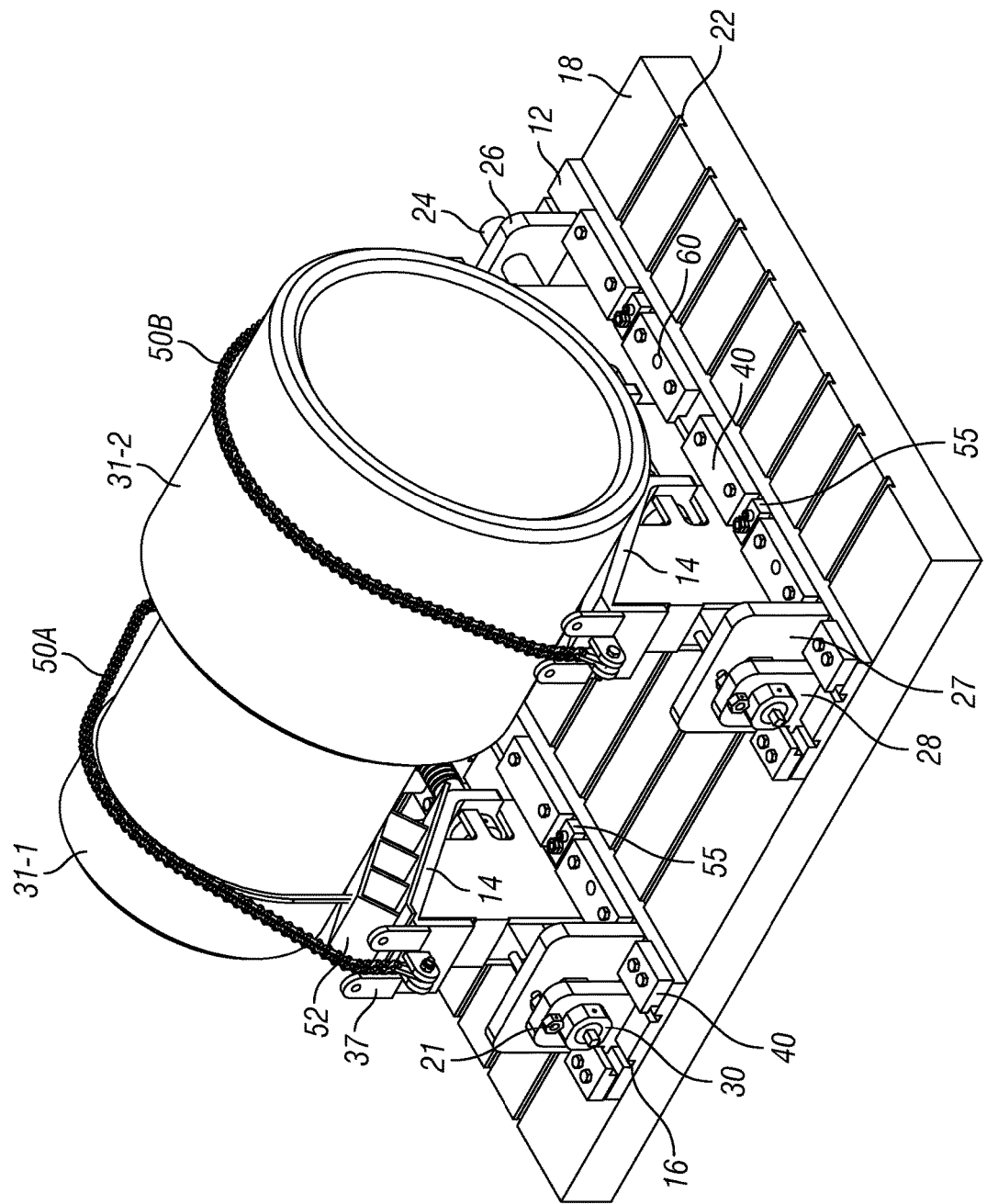
FIG. 12 is a perspective view of the assembly of FIG. 11 supporting a workpiece.
Figure 13:
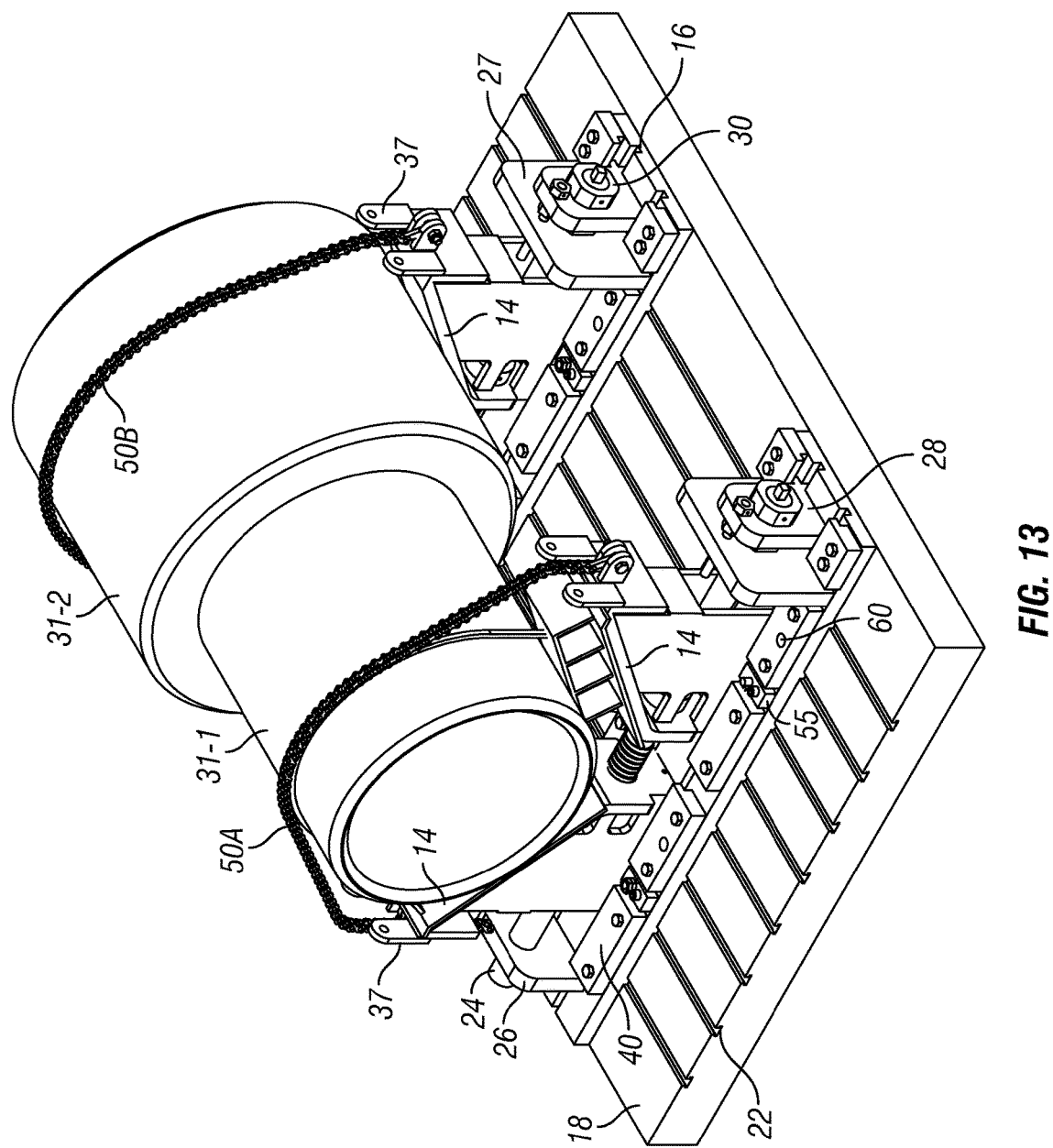
FIG. 13 is another perspective view of the assembly of FIGS. 11 and 12.
Figure 14:
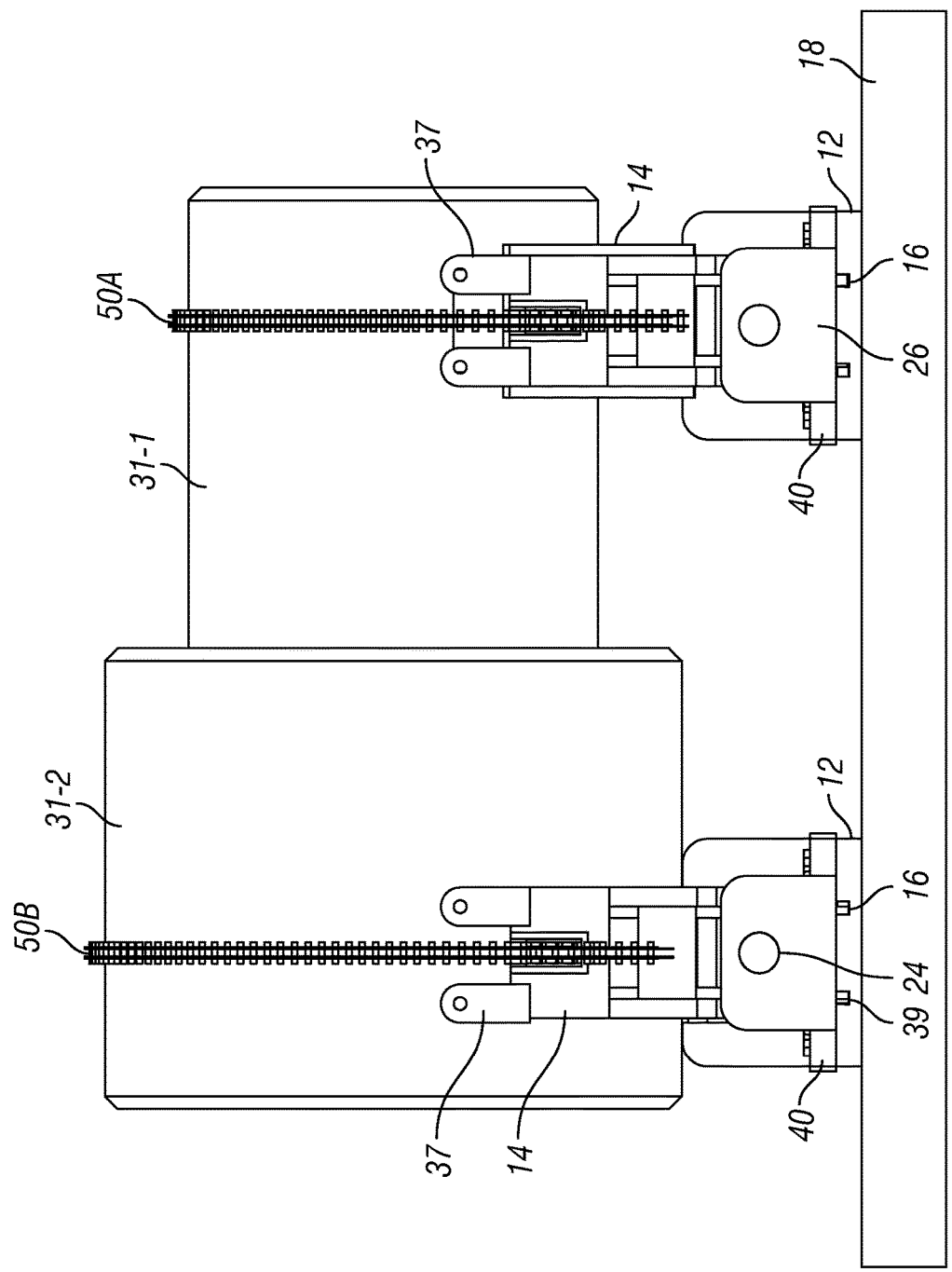
FIG. 14 is a side view of the assembly of FIGS. 11-13.
Figure 15:
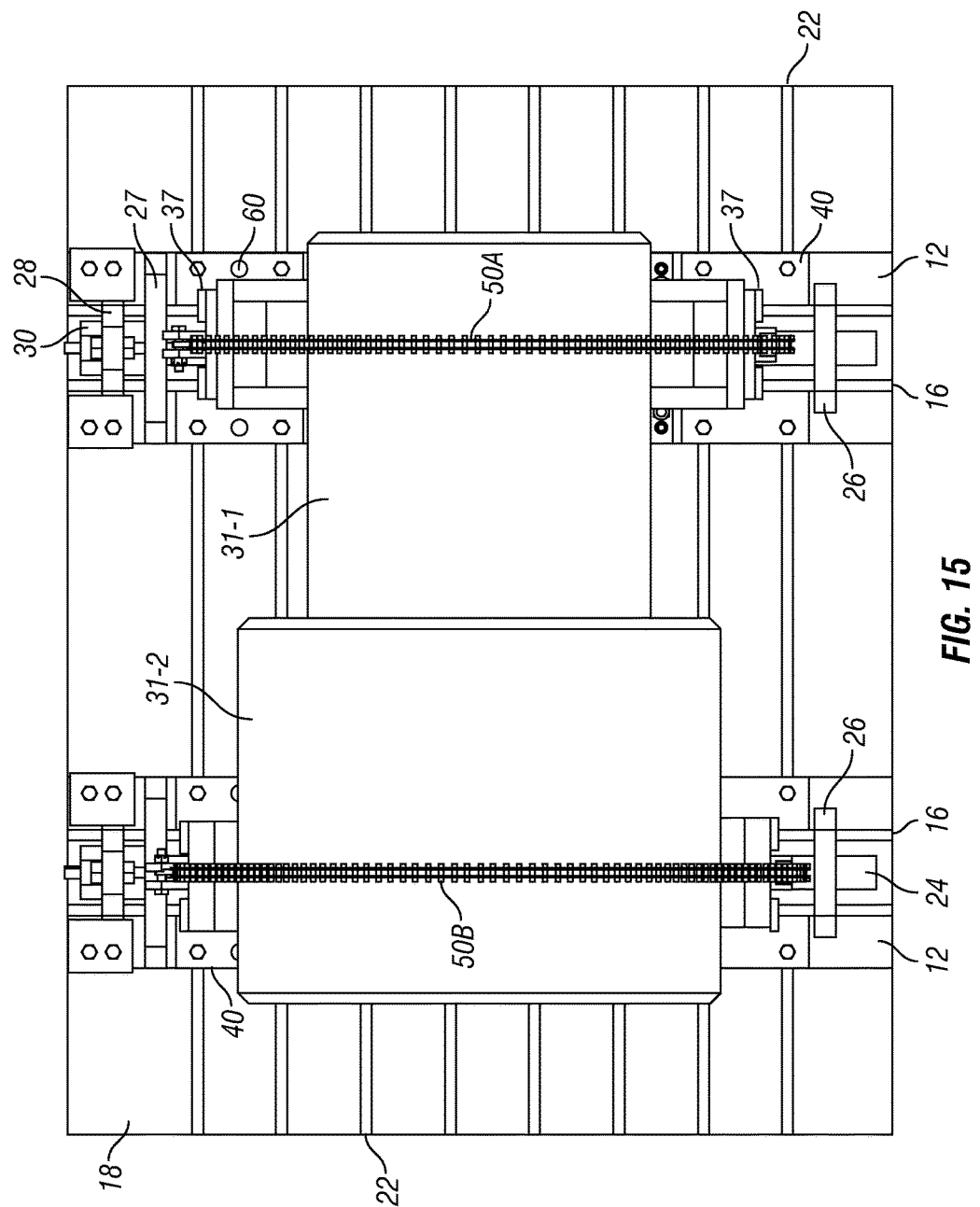
FIG. 15 is a top view of the assembly of FIGS. 11-14.
Figure 16:
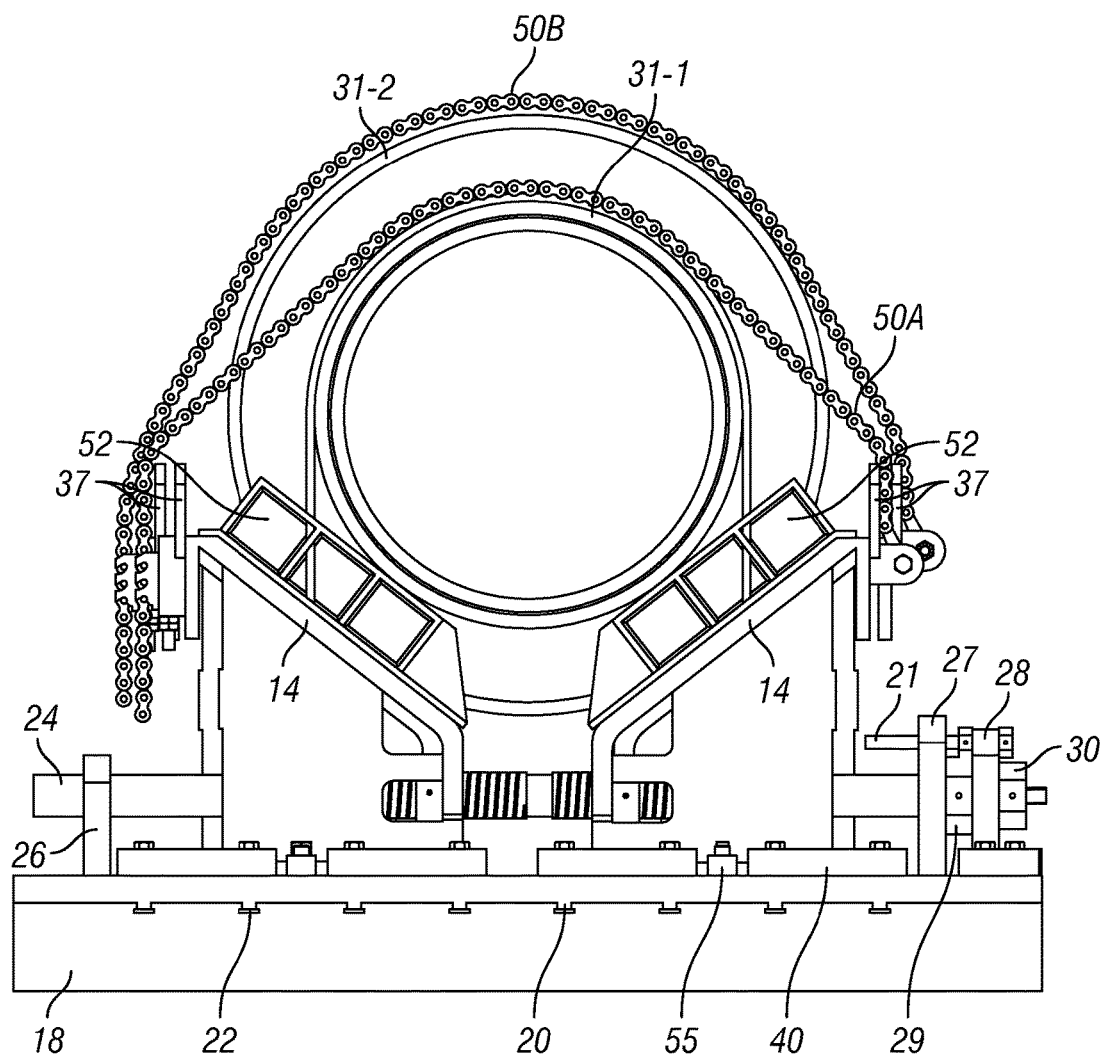
FIG. 16 is a front view of the assembly of FIGS. 11-15.

The base 12 in FIG. 8 includes a substantially planar type second surface 17 operationally configured to rest atop one or more substantially planar type support surfaces as described above. As shown in another embodiment of an assembly 10 as depicted in FIGS. 10A and 10B, the second surface 17 may include a plurality of raised tracks 20 operationally configured to engage a plurality of bed grooves 22 as shown in FIG. 11. In one suitable embodiment, the width of the raised tracks 20 and the spacing between the raised tracks 20 may be provided according to the configuration of target grooves 22 of a known bed 18.

FIGS. 11-16 represent another particular embodiment of an assembly 10 operationally configured to support objects including workpieces 100 having differing sizes, e.g., a smaller section 31-1 and larger section 31-2. The present assembly 10 is suitably operationally configured for use with one or more work stations including industrial and/or mechanical type work stations that may employ workholding features. Suitable work stations may include, but are not necessarily limited to mechanics work stations, metalworking work stations, woodworking work stations, plastic working work stations, and combinations thereof. With reference to FIG. 11, the assembly 10 may be used with a CNC machine having a grooved bed 18 in the form of a T-slotted floor plate. As shown, the second surface 17 of the base 12 may include one or more raised tracks 20 operationally configured to engage the one or more grooves 22 of the bed 18 in two directions by turning the base 12 180.0 degrees about the bed 18. In other words, the raised track 20 configuration as shown in FIG. 11 establishes two orientations of the base 12 relative to the bed 18.

Figure 17:
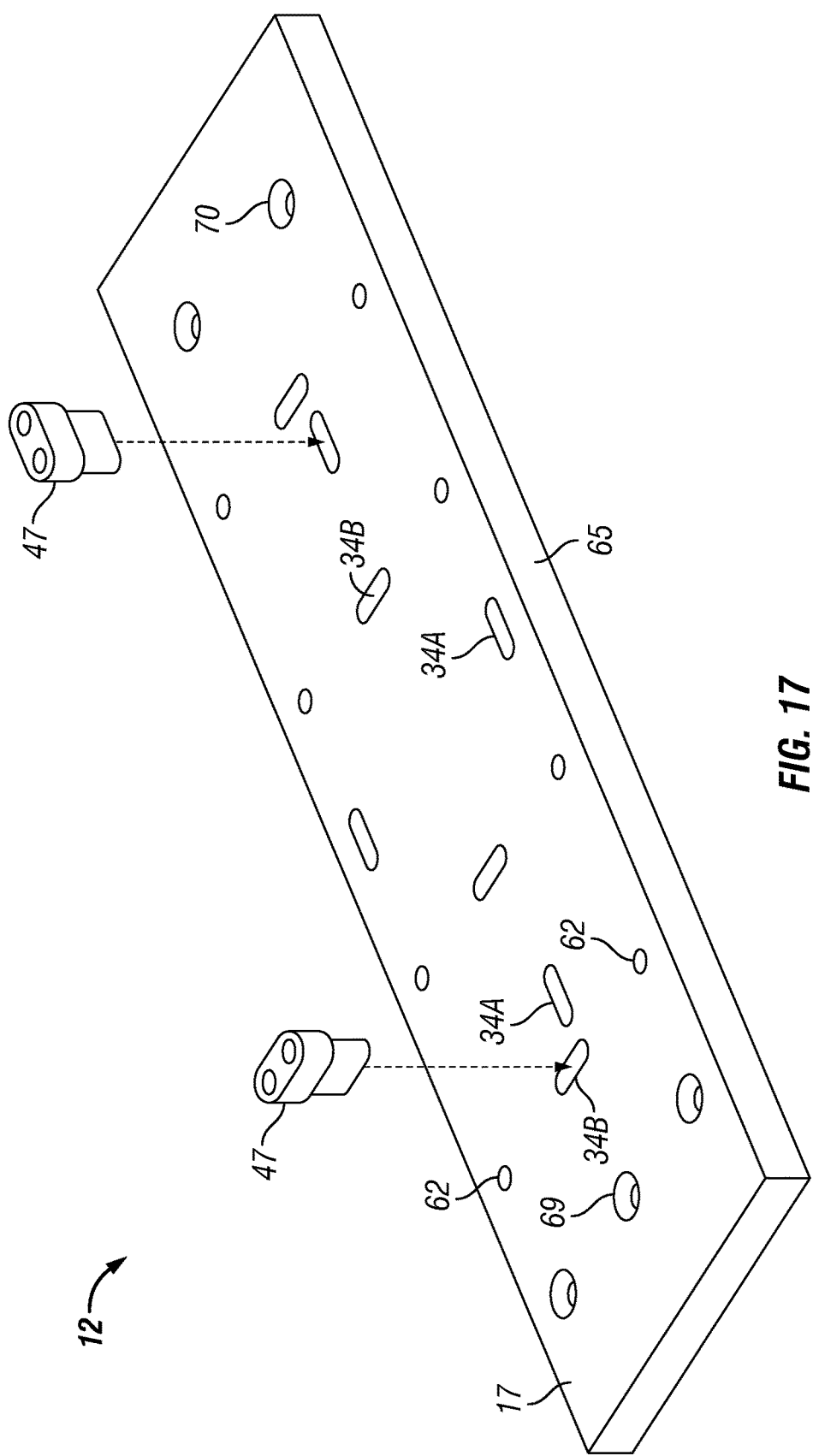
FIG. 17 is a perspective view of an exemplary second surface configuration of a base of an assembly of this application.

Other second surface 17 configurations effective for use with grooved beds 18 or T-slotted floor plates are also contemplated. For example, as illustrated in FIG. 17 a second surface 17 of a base 12 may be provided that is operationally configured to establish two or more orientations of the base 12 relative to a bed 18. As shown, the second surface 17 of a base 12 may include a substantially planar surface defined by (1) one or more first slots 34A, each aligned lengthwise in a first orientation and (2) one or more second slots 34B, each aligned lengthwise in a second orientation. Each slot 34A, 34B includes a depth effective to receive at least part of a removable raised insert member 47 therein. Suitably, one end of each raised insert members 47 employed is operationally configured to mate with the slots 34A and 34B and the opposing end of each raised insert member 47 is operationally configured to mate with one or more grooves 22 of a corresponding bed 18. As depicted in FIG. 17, one or more first slots 34A may be arranged lengthwise along the second surface 17 of the base 12 substantially parallel to the longitudinal sides 65 of the base 12. One or more second slots 34B may be arranged lengthwise along the second surface 17 substantially perpendicular to first slots 34A. In this embodiment, raised insert members 47 may be set within slots 34A for mating with grooves 22 in a manner effective to align the base 12 lengthwise in a substantially parallel orientation with the grooves 22. Alternatively, raised insert members 47 may be set within one or more slots 34B for mating with grooves 22 in a manner effective to align the base 12 lengthwise in a substantially perpendicular orientation with the grooves 22. Other slot 34 orientations are contemplated herein. For example, in an embodiment where it may be desirable to position the base 12 lengthwise in either a non-parallel or non-perpendicular orientation according to the grooves 22 of a bed 18, one or more additional slot arrangements other than the arrangement of slots 34A and 34B may be disposed along the second surface 17 of the base 12 as desired.

Referring again to the embodiment of FIG. 11, the assembly 10 may include two bases 12 each having a pair of substantially parallel guides 16 disposed along the length of the first surfaces 13 of each base 12. The second surfaces 17 of the bases 12 may be provided as desired, including one or both second surfaces 17 of the two bases 12 being provided as depicted in FIG. 17 for mating with a bed 18. As shown, the assembly 10 also includes two sets of platforms 14, each set being operationally configured to work with a corresponding base 12. As described previously, the bases 12 are operationally configured to receive platforms 14 in communication thereto in a manner effective to allow the platforms 14 to be directed along the guides 16 as desired or as otherwise required according to a particular workpiece 100 supported by the assembly 10. As shown in FIG. 11, the platforms 14 may include slide plates 38 with raised tracks 39 for engaging the guides 16 in a manner effective for the platforms 14 to slide or otherwise be directed along the guides 16.

It is further contemplated that one or more spacer members 52 may be attached to one or more platforms 14 to provide a secondary support surface for a workpiece 100 apart from the platform 14 surfaces. Spacer members 52 may be attached to the platforms 14 as desired. In one embodiment, spacer members 52 may be hooked to the platforms 14. In another embodiment, spacer members 52 may be secured to the platforms 14 via fasteners 53 such as bolts and the like running through corresponding apertures of the spacer members 52 and apertures 15 of the platforms 14 (see exemplary platform 14 of FIG. 18). Spacer members 52 of one or more sizes may be employed as desired. In one embodiment, like spacer members 52 may be secured to corresponding platforms 14 to accommodate a particular workpiece 100 and/or a particular workpiece 100 operation. In another embodiment, a single spacer member 52 may be employed for use with only one platform 14 to accommodate a particular workpiece 100 and/or a particular workpiece 100 operation. In another embodiment, dissimilar spacer members 52 may be employed on corresponding platforms 14 to accommodate a particular workpiece 100 and/or a particular workpiece 100 operation. It is further contemplated that multiple spacer members 52 may be stacked and secured to one or more platforms 14. Spacer members 52 may also be secured to one or more side panels where applicable. In addition, spacer members 52 may be constructed from materials similar or dissimilar as corresponding platforms 14 or other assembly 10 component parts as desired. Suitable spacer member 52 materials of construction include, but are not necessarily limited to metals, plastics, natural rubbers, synthetic rubbers, cementitious materials, woods, filled composite materials, and combinations thereof. One suitable spacer member 52 may be constructed from steel. Another suitable spacer member 52 may be constructed from poly(vinyl chloride). Another suitable spacer member 52 may be constructed from one or more hard plastics including, but not necessarily limited to polystyrene, acrylic resins, acrylonitrile butadiene styrene (ABS) resins, and combinations thereof. Another suitable spacer member 52 may be constructed from one or more rubbers effective to (1) prevent chipping and abrasions of the spacer members 52 and/or (2) provide a suitable amount of shock absorption. One suitable rubber spacer member 52 may be constructed from fiber reinforced prime rubber with nylon and polyester as understood by the skilled artisan. Another suitable spacer member 52 may include a rubber body covered by a steel face for engaging a workpiece 100.

Figure 19:
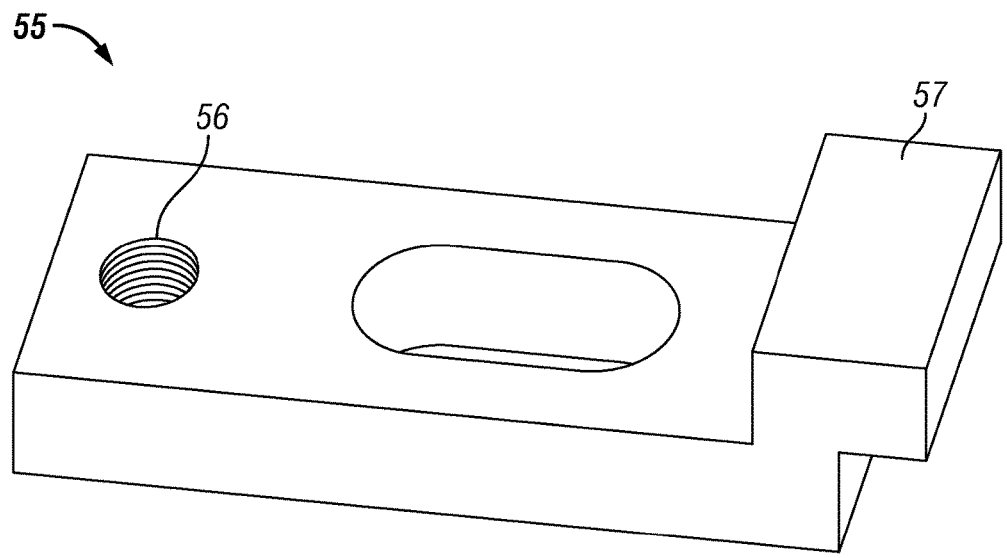
FIG. 19 is a perspective view of an exemplary locking member of an assembly of this application.
Figure 21:
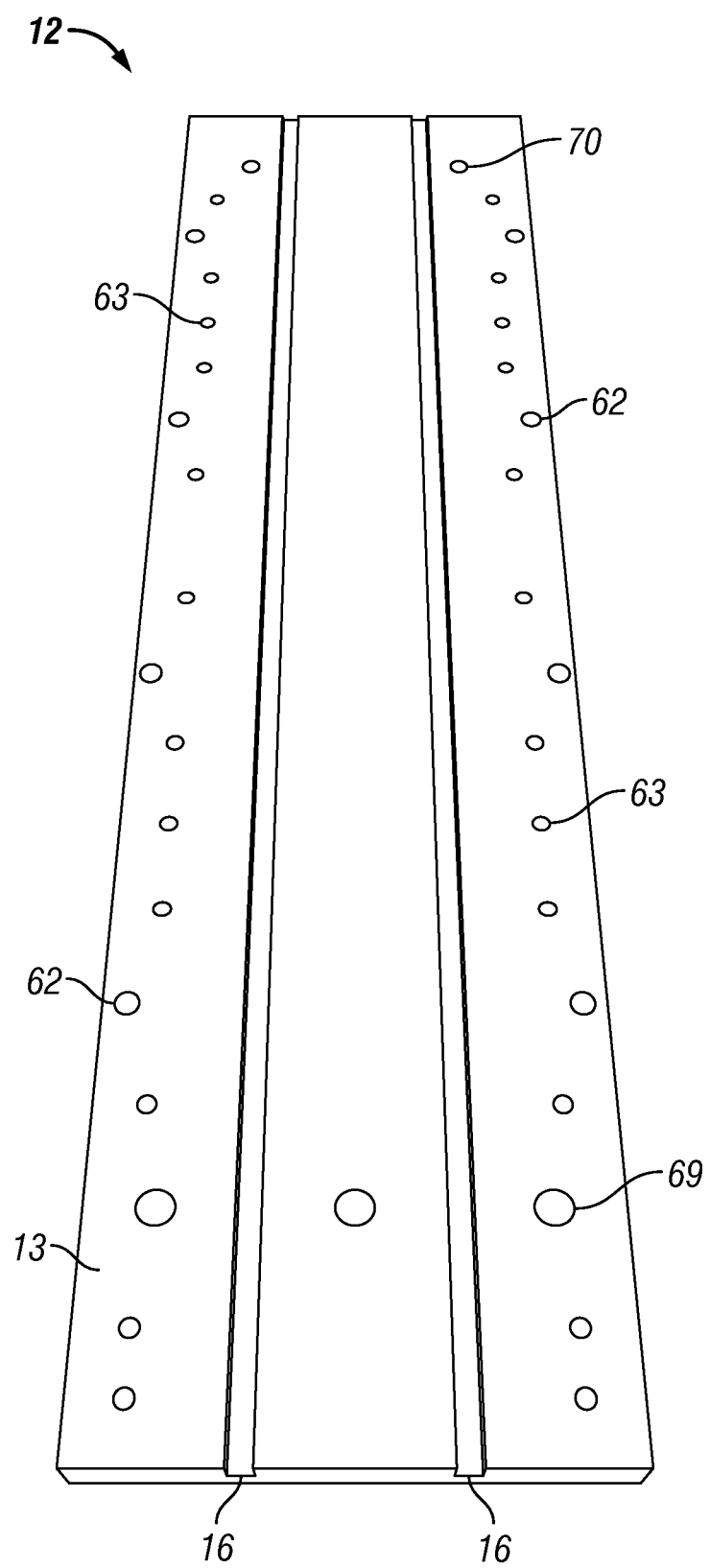
FIG. 21 is a perspective view of an exemplary first surface of a base of an assembly of this application.

As mentioned, the assembly 10 may include one or more guide blocks 40 operationally configured to prevent lateral movement of the platforms 14 and/or disengagement of the platforms 14 from guides 16 during operation. In addition, the assembly 10 may also include and one or more locking members 55 operationally configured to prevent horizontal movement of the platforms 14 apart from a base 12 during operation. The one or more locking members 55 may be provided as hold down devices operationally configured to be releasably secured to the base 12 via fasteners such as bolts, pins, and the like at spaces or gaps 42 between guide blocks 40 in a manner effective to sandwich at least part of the slide plate 38 between the locking member 55 and base 12. In operation, locking members 55 are suitably effective to assist in maintaining a static position of the platforms 14 relative to the corresponding base 12. As shown in FIG. 19, a suitable locking member 55 may include an elongated member including an engagement surface for engaging at least part of a base 12 and at least part of a slide plate 38. In the embodiment of FIG. 19, the locking member 55 includes an aperture 56 for receiving a fastener there through and an offset lip 57 operationally configured to sandwich at least part of a slide plate 38 against the base 12. In one suitable embodiment, the engagement surface of the offset lip 57 may be offset at a distance about equal the height of the outer surface of the slide plate 38 for abutment between engagement surface of the offset lip 57 and the outer surface of the slide plate 38. Suitably, the base 12 includes apertures 63 (see FIG. 21) corresponding with apertures 56 of the locking members 55 whereby a fastener may be set through aperture 56 and corresponding aperture 63 to secure the locking member 55 to the assembly 10 in a fixed position. In one embodiment, threaded apertures 63 may be employed for mating with threaded bolt type fasteners. In another embodiment, apertures 63 may be operationally configured to mate with bolt clamps and the like.

Figure 20:
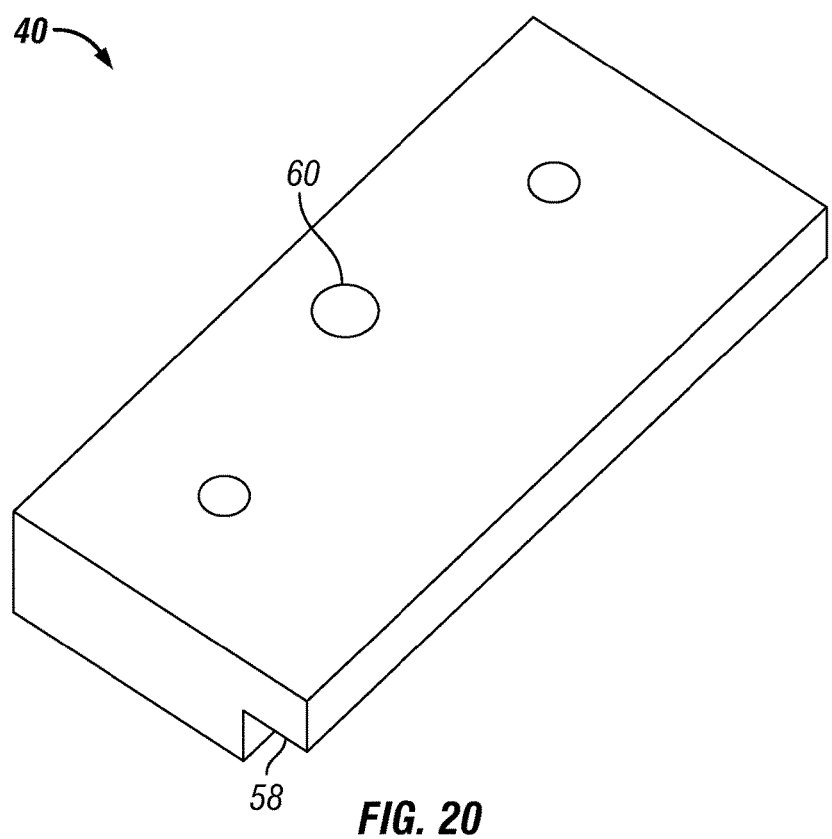
FIG. 20 is a perspective view of an exemplary guide retaining member of an assembly of this application.
Figure 22:
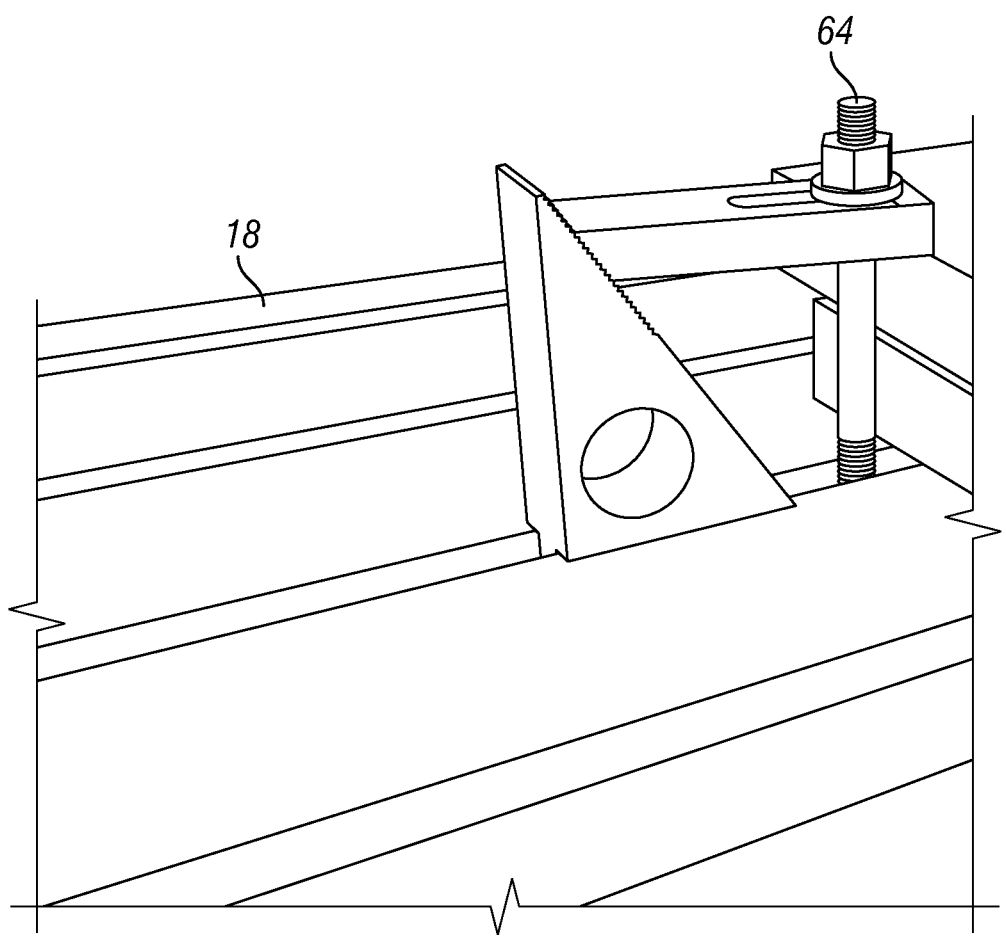
FIG. 22 is a perspective view of an exemplary T-nut and clamp assembly in simplified operation.

Turning to FIG. 20, the one or more guide blocks 40 may also include an offset lip 58 for sandwiching at least part of the slide plate 38 against the base 12. Suitable guide blocks 40 may also include apertures 60 there through corresponding to apertures 62 in the base 12 (see FIG. 21). As such, fasteners may be employed to secure the guide blocks 40 to the base 12 via apertures 60 and 62. Suitable fasteners may include, but are not necessarily limited to dowel pins, bolts and bolt clamps as is understood by the skilled artisan. In another suitable embodiment, each guide block 40 may be secured to the base 12 via a threaded T-nut and clamp assembly 64 as understood by the skilled artisan. As understood by persons of ordinary skill in the art of T-slotted floor plates, a T-nut and clamp assembly 64 includes a bolt member disposed through apertures 60 and 62 and a corresponding groove 22 of the bed 18 in a manner effective to secure the guide block 40 in a fixed position (see exemplary T-nut and clamp assembly 64 of FIG. 22). The size, shape and position of the apertures 60 along the guide blocks 40 may vary as desired.

Figure 23:
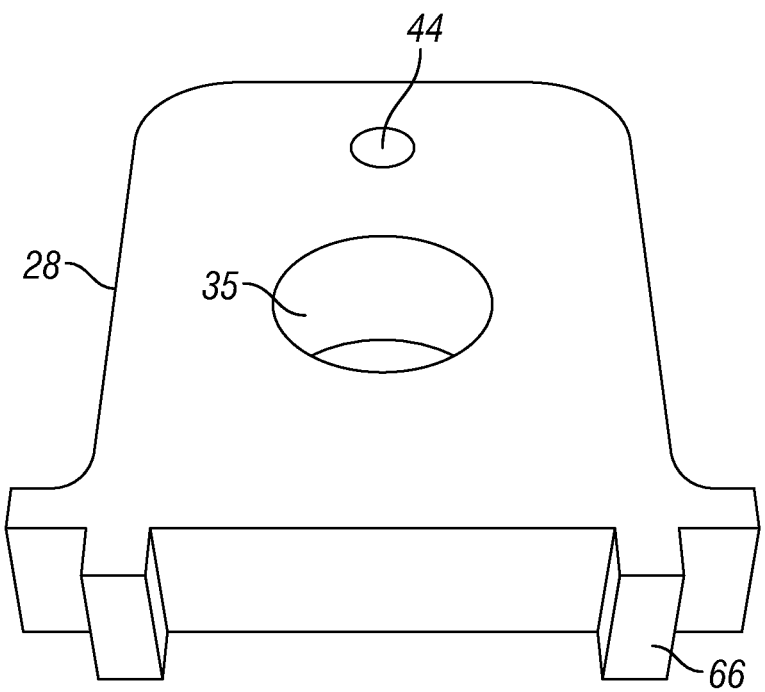
FIG. 23 is a perspective view of an exemplary support member of an assembly of this application.
Figure 24:
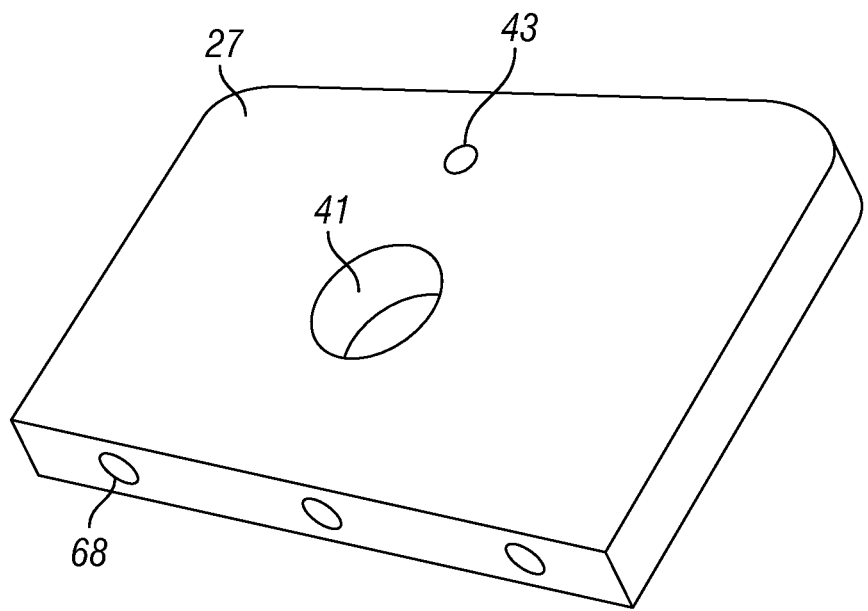
FIG. 24 is a perspective view of another exemplary support member of an assembly of this application.

Simplified embodiments of an exemplary actuation support member 28 and a second shaft support member 27 are provided FIGS. 23 and 24 respectively. As shown in FIG. 23, an actuation support member 28 may include raised tracks 66 operationally configured to mate with guides 16 of a base 12. The second shaft support member 27 of FIG. 24 may include one or more holes 68 corresponding to apertures 69 of a base 12 (see FIG. 21) whereby the second shaft support member 27 may be releasably secured to the base 12 via fasteners such as bolts, pins, screws and the like. A support 26 may also be similarly releasably secured near the opposite end of the base 12 at apertures 70 (see FIG. 21). As shown in FIG. 17, the apertures 69, 70 may be countersunk. In other embodiments, the apertures 69, 70 may include plain type holes, counterbore holes, countersunk holes, and combinations thereof.

Figure 26:
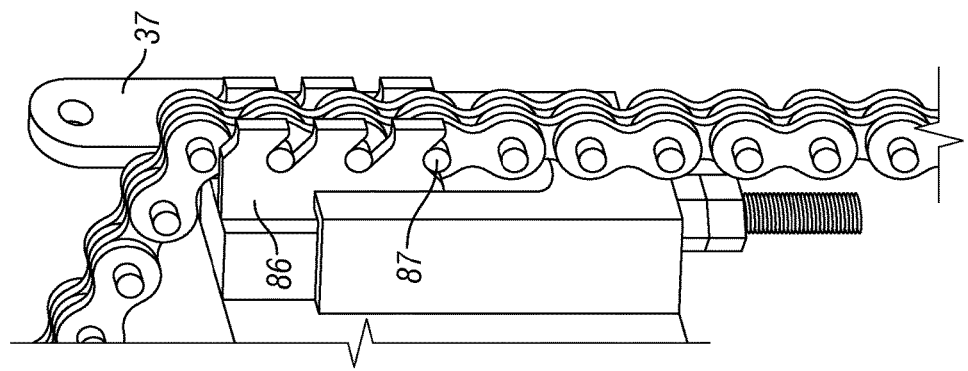
FIG. 26 is a simplified view of an exemplary chain catch member of this application.
Figure 25:
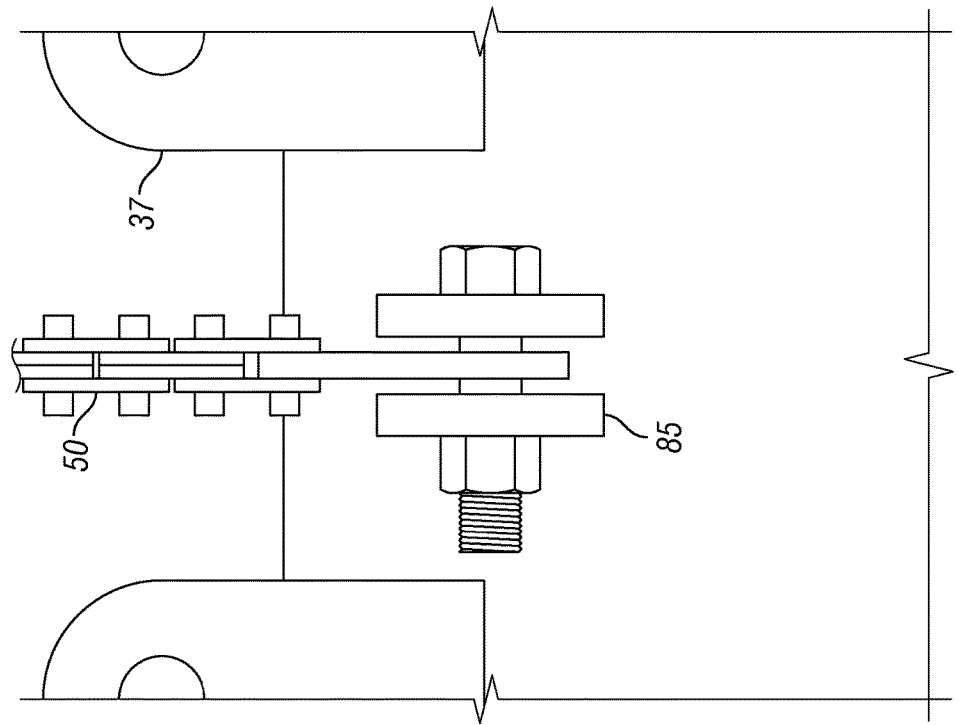
FIG. 25 is a simplified view of an exemplary chain eye and bolt assembly of this application.

In the particular embodiment of the assembly 10 as described with reference to FIGS. 11-16, the restraints 50a and 50b are suitably provided as chain like members including, but not necessarily limited to a roller chain as understood by the skilled artisan. As shown in FIG. 25, a first end of each chain 50a and 50b is suitably anchored to a platform 14 via a releasable chain eye and bolt assembly 85. The opposing platform 14 of each pair of platforms may include a chain catch member 86 set along the outer upper edge of the platform 14 operationally configured to catch and hold the second end or free end of each chain 50a and 50b. As shown in the embodiment of FIG. 26, one exemplary chain catch member 86 may include a series of one or more hook type members operationally configured to engage pins 87 of the chains 50a and 50b in a manner effective to secure the chains 50a and 50b to assist in maintaining the workpiece 100 in a fixed position with the assembly 10.

Figure 27:
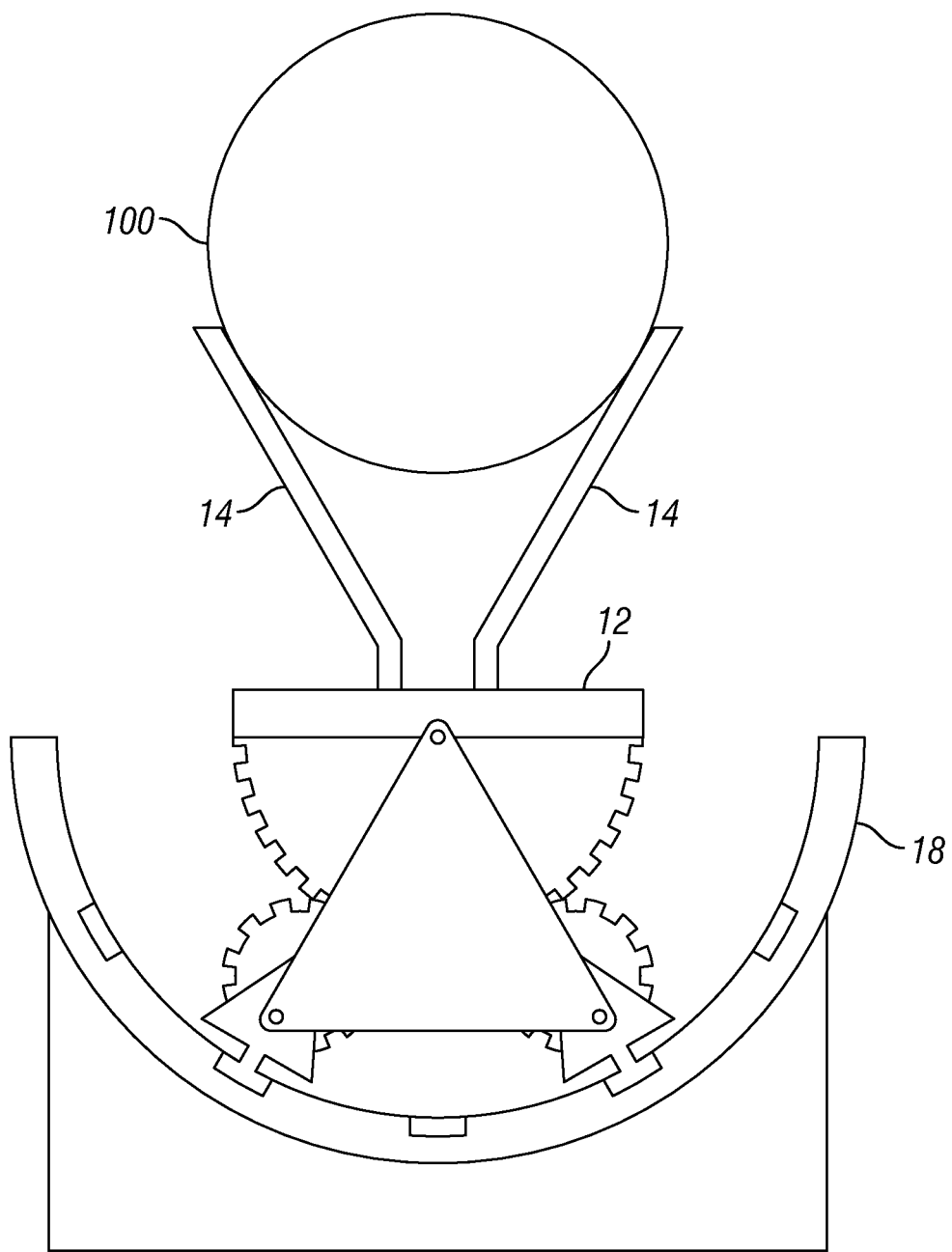
FIG. 27 is a front view of another embodiment of an assembly of this application.

In still another embodiment as shown in FIG. 27, it is further contemplated that the bed 18 and/or the base 12 may include non-planar surfaces. As shown, the bed 18 may be curved in a manner effective to move the platforms 14 and workpiece 100 supported therein according to the shape of the bed 18 to orient the workpiece 100 as desired. In another embodiment, one or more bases 12 of an assembly 10 may be curved and operationally configured to act as travel surfaces for one or more pairs of platforms 14. In still another embodiment, one or more bases 12 may be provided having a first planar type travel surface for a first platform 14 and a second non-planar travel surface for an opposing second platform 14. Actuation of such platforms 14 may be performed as desired.

As shown in the various figures of this application, variations in the assembly 10 may be provided as desired. In addition, the one or more parts making up the assembly 10 may be constructed from one or more materials suitable for providing operative structural support in connection with one or more particular target objects or workpieces 100. Suitable materials may include, but are not necessarily limited to, those materials resistant to chipping, cracking, excessive bending and reshaping as a result of weathering, heat, moisture, other outside mechanical and chemical influences, as well as impacts to the assembly 10. Particular materials may include, but are not necessarily limited to metals, plastics, rubbers, cementitious materials, polished rock, woods, filled composite materials, and combinations thereof. Suitable metals include ferrous metals and non-ferrous metals. A suitable ferrous metal may include an iron alloy, for example, steel. In addition, various component parts may be joined together via welds, adhesive materials, fasteners, and combinations thereof depending on the materials of construction used and/or the purpose of a particular assembly 10. In one exemplary embodiment including metal component parts, the metal component parts may be sand blasted and have a clear coat added to the surface of the component parts prior to assembly 10 operation.

In one particular embodiment of the assembly 10 operationally configured to support a workpiece 100 having a maximum diameter (or width) up to about 228.6 cm (about 90.0 inches) and a minimum diameter (or width) down to about 71.1 cm (about 28.0 inches), the assembled assembly 10 may include the various exemplary dimensions as shown in Table 1.

TABLE 1

| Part | Measurement | Dimension |
| --- | --- | --- |
| Base 12 | Length | about 195.6 cm (about 77.0 inches) |
| | Width | about 45.7 cm (about 18.0 inches) |
| | Height | about 5.08 cm (about 2.0 inches) |
| | Height of Raised Tracks 20 | about 2.54 cm (about 1.0 inches) |
| Shaft 24 | Length | about 195.6 cm (about 77.0 inches) |
| | Diameter | about 7.62 cm (about 3.0 inches) |
| Platform 14 | Length of Support Surface | about 78.7 cm (about 31.0 inches) |
| | Width of Support Surface | about 30.5 cm (about 12.0 inches) |
| | Height of Distal End from First Surface 13 of the Base 12 | about 82.6 cm (about 32.5 inches) |
| Support 26 | Height from First Surface 13 of the Base 12 | about 22.9 cm (about 9.0 inches) |
| | Thickness | about 5.08 cm (about 2.0 inches) |
| Support 27 | Height from First Surface 13 of the Base 12 | about 27.9 cm (about 11.0 inches) |
| | Thickness | about 5.08 cm (about 2.0 inches) |
| Actuation Support Member 28 | Height from First Surface 13 of the Base 12 | about 27.9 cm (about 11.0 inches) |
| | Thickness | about 5.08 cm (about 2.0 inches) |

In another particular embodiment of the assembly 10 operationally configured to support a workpiece 100 having a maximum diameter (or width) up to about 71.1 cm (about 28.0 inches) and a minimum diameter (or width) down to about 7.62 cm (about 3.0 inches), the assembled assembly 10 may include the various exemplary dimensions as shown in Table 2.

TABLE 2

| Part | Measurement | Dimension |
| --- | --- | --- |
| Base 12 | Length | about 80.6 cm (about 31.75 inches) |
| | Width | about 23.5 cm (about 9.25 inches) |
| | Height | about 4.45 cm (about 1.75 inches) |
| | Height of Raised Tracks 20 | about 1.27 cm (about 0.50 inches) |
| Shaft 24 | Length | about 91.4 cm (about 36.0 inches) |
| | Diameter | about 4.45 cm (about 1.75 inches) |
| Platform 14 | Length of Support Surface | about 30.5 cm (about 12.0 inches) |
| | Width of Support Surface | about 15.2 cm (about 6.0 inches) |
| | Height of Distal End from First Surface 13 of the Base 12 | about 30.5 cm (about 12.0 inches) |
| Support 26 | Height from First Surface 13 of the Base 12 | about 8.89 cm (about 3.50 inches) |
| | Thickness | about 3.18 cm (about 1.25 inches) |
| Support 27 | Height from First Surface 13 of the Base 12 | about 12.7 cm (about 5.0 inches) |
| | Thickness | about 3.18 cm (about 1.25 inches) |
| Actuation Support Member 28 | Height from First Surface 13 of the Base 12 | about 12.7 cm (about 5.0 inches) |
| | Thickness | about 3.18 cm (about 1.25 inches) |

As mentioned previously, the present assembly 10 may be built dimensionally to scale, or in the alternative, one or more various component parts may be enlarged and/or decreased in size in relation to other component parts as desired. Some embodiments of the assembly 10 may be small enough and/or light enough to be maneuvered and/or carried by one or more persons. Other embodiments of the assembly 10 may include a size and/or weight too great for manual lifting and/or transport and/or positioning atop a particular support surface. In such instances, lifting equipment may be employed to lift and/or transport and/or position an assembly 10 upon a target support surface, for example, a bed 18 of a CNC machine. Suitable types of lifting equipment may include, but are not necessarily limited to forklift trucks, overhead cranes, chain hoists, wench hoists, cable/pulley systems, forklift jacks, hand trucks, pallet trucks, wheel dollies, and combinations thereof. In other embodiments it is contemplated that an assembly 10 may be assembled at a particular target site. As an example, an assembly 10 may be assembled part by part on a target bed 18 of a CNC machine starting with aligning one or more bases 12 along the bed 18 as desired.

As will be understood by those of ordinary skill in the art, and others, many modifications may be made without departing from the spirit and scope of the invention. The embodiments described herein are meant to be illustrative only and should not be taken as limiting the invention, which is defined in the following claims.

I claim:

1. An assembly for supporting an object on a support surface including:
 a base member defined by a length, width and height, the base member having a first travel surface and an opposing second surface;
 a pair of support platforms in communication with the base member;
 a shaft in threaded communication with the support platforms, the shaft dictating travel of the support platforms along the first travel surface;
 a first shaft support member releasably attached to the first travel surface in a fixed position and operationally configured to support a first end of the shaft apart from the first travel surface;
 a second shaft support member releasably attached to the first travel surface in a fixed position and operationally configured to support a second end of the shaft apart from the first travel surface; and
 a third shaft support member in travel communication with the first travel surface and operationally configured to support the second end of the shaft apart from the first travel surface;
 wherein the first travel surface of the base member includes one or more grooves of a particular depth and width within the base member that are disposed along the length of the travel surface for receiving at least part of each of the support platforms and the third shaft support member in travel communication therein; and wherein the second surface is operationally configured to engage the support surface.

2. The assembly of claim 1 wherein the support platforms include raised tracks operationally configured to engage the one or more grooves.

3. The assembly of claim 1 wherein the first travel surface is defined by a length less than the length of the shaft.

4. The assembly of claim 1 wherein the second surface of the base member is operationally configured to engage grooves of a T-slotted floor plate.

5. The assembly of claim 1 wherein the third shaft support member has an aperture for receiving the second end of the shaft there through.

6. The assembly of claim 1 wherein the first and second shaft support members are operationally configured to maintain the longitudinal axis of the shaft substantially parallel to the plane of the first travel surface of the base member.

7. The assembly of claim 1 wherein each of the support platforms include bracing members attached to slide plates, the slide plates being in travel communication with the one or more grooves.

8. The assembly of claim 7 further including one or more guide retaining members disposed along the base member adjacent the one or more grooves, the one or more guide retaining members being operationally configured to engage the slide plates to maintain the support platforms in communication with the one or more grooves during operation of the actuation member.

9. The assembly of claim 8 further including one or more locking members releasably securable to the base member via fasteners, the one or more locking members being operationally configured to engage the slide plates and secure the support platforms to the base member.

10. The assembly of claim 9 wherein the one or more guide retaining members and the one or more locking members include apertures there through and wherein the base member includes a plurality of apertures disposed along the travel surface, the one or more guide retaining members and the one or more locking members being securable to the base member via the fasteners operationally configured to be set through the apertures of the one or more guide retaining members, the one or more locking members and of the base member.

11. The assembly of claim 1 wherein the opposing second surface includes a plurality of elongated first slots aligned in a first orientation lengthwise according to the length of the base member and a plurality of elongated second slots in a second orientation lengthwise according to the width of the base member perpendicular to the first slots, each of the first and second slots including a depth within the opposing second surface of the base member effective to receive a removable insert member in a mated position therein, once mated, each removable insert member being effective to raise out from the second surface in a manner effective to mate with grooves of a T-slotted floor plate.

12. The assembly of claim 1 wherein each of the support platforms includes an aperture having a non-circular curved inner surface for receiving the shaft there through.

13. The assembly of claim 5 further including threaded members in threaded communication with the shaft, the threaded members being located on opposing sides of the third shaft support member, wherein the third shaft support member is connected to the second shaft support member via an adjustment member, the adjustment member being operationally configured to direct the third shaft support member linearly toward and away from the second shaft support member.

14. The assembly of claim 1 further including a restraint attachable to the support platforms, the restraint being operationally configured to secure the object to the support platforms.

15. The assembly of claim 14 wherein the restraint is a roller chain and wherein the roller chain is 1) secured to one support platform via a releasable chain eye and bolt assembly of the support platform and 2) secured to the opposing support platform via a chain catch member of the opposing support platform that is operationally configured to catch and hold a free end of the roller chain in a manner effective to adjust the length of the roller chain for maintaining the object in a fixed position with the assembly.

16. A support assembly for maintaining an object apart from a work bed including:

a first pair of support platforms operationally configured to support a first part of an object along a travel surface of a first travel surface member;

a second pair of support platforms operationally configured to support a second part of the object along a travel surface of a second travel surface member;

a first cylindrical shaft in communication with the first pair of support platforms and operationally configured to dictate travel of the first pair of support platforms along the first cylindrical shaft in a manner effective to adjust the distance between the first pair of support platforms and translate the first part of the object along both X and Y axes;

a second cylindrical shaft in communication with the second pair of support platforms and operationally configured to dictate travel of the second pair of support platforms along the second cylindrical shaft in a manner effective to adjust the distance between the second pair of support platforms and translate the second part of the object along both X and Y axes;

a first set of shaft supports in communication with the first travel surface member and the first cylindrical shaft including first and second fixed shaft supports and a first travelable shaft support connected to the second fixed shaft support via a first adjustment member; and a second set of shaft supports in communication with the second travel surface member and the second cylindrical shaft including third and fourth fixed shaft supports and a second travelable shaft support connected to the fourth fixed shaft support via a second adjustment member;

when the first cylindrical shaft and first pair of support platforms are set at a fixed position, the first adjustment member is operationally configured to adjust the distance between the first travelable shaft support and the second fixed shaft support in a manner effective to move the fixed first cylindrical shaft and first pair of support platforms along the travel surface of the first travel surface member; and when the second cylindrical shaft and second pair of support platforms are set at a fixed position, the second adjustment member is operationally configured to adjust the distance between the second travelable shaft support and the fourth fixed shaft support in a manner effective to move the fixed second cylindrical shaft and second pair of support platforms along the travel surface of the second travel surface member.

17. The support assembly of claim 16 wherein at least one of the first and second travel surface members are operationally configured to engage a T-slotted floor plate in two or more orientations relative to the T-slotted floor plate.

18. The support assembly of claim 16 further including one or more restraints effective to maintain the object in communication with at least one of the pairs of support platforms.

19. The support assembly of claim 16 wherein the support platforms are operationally configured to receive one or more spacer members in attachment thereto, the spacer members being operationally configured to provide support surfaces for the object.

20. A method for multi-axis machining of a workpiece, comprising:

providing an assembly including (a) a first base member and a second base member, each base member having a first travel surface and an opposing second surface, each travel surface having a plurality of grooves disposed along the travel surface, the second surfaces being operationally configured to engage one or more grooves of a T-slotted a floor plate of a multi-axis machining device in a manner effective to align the first and second base members in a first position and a second position perpendicular to the first position, (b) a first pair of support platforms in communication with the grooves of the first base member and a second pair of support platforms in communication with the grooves of the second base member, each of the pairs of support platforms being operationally configured to contact the workpiece at one or more points along the workpiece in a manner effective to maintain the workpiece in a fixed position apart from the floor plate, (c) a first actuation member in communication with the first pair of support platforms and a second actuation member in communication with the second pair of support platforms, each actuation member being operationally configured to adjust the position of its corresponding pair of support platforms along the corresponding travel surface thereby adjusting the one or more contact points in relation to the floor plate, (d) each second surface having one or more first slots and one or more second slots, each of the first and second slots having a common shape and depth effective to receive at least one interchangeable insert member therein in a manner effective to engage one or more grooves of said T-slotted floor plate, the one or more first slots being arranged lengthwise in a first orientation and the one or more second slots being arranged lengthwise in a second orientation perpendicular to the one or more first slots; and with a workpiece supported by the assembly in a fixed position, using the multi-axis machining device to operate on the workpiece.

\* \* \* \* \*